US007138539B2

(12) United States Patent
Cyr et al.

(10) Patent No.: US 7,138,539 B2
(45) Date of Patent: Nov. 21, 2006

(54) COLORANT COMPOUNDS CONTAINING COPOLYMERIZABLE VINYL GROUPS

(75) Inventors: Michael John Cyr, League City, TX (US); Max Allen Weaver, Kingsport, TN (US); Gerry Foust Rhodes, Piney Flats, TN (US); Jason Clay Pearson, Kingsport, TN (US); Phillip Michael Cook, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 11/249,793

(22) Filed: Oct. 13, 2005

(65) Prior Publication Data

US 2006/0052469 A1    Mar. 9, 2006

Related U.S. Application Data

(62) Division of application No. 09/920,904, filed on Aug. 2, 2001, now Pat. No. 6,727,372.

(60) Provisional application No. 60/223,521, filed on Aug. 7, 2000.

(51) Int. Cl.
C07C 229/48 (2006.01)
C07D 207/40 (2006.01)

(52) U.S. Cl. .......................... 560/19; 548/547; 560/43; 560/48

(58) Field of Classification Search .................. 560/19, 560/43, 48; 548/547
See application file for complete search history.

(56) References Cited

U.S. PATENT DOCUMENTS

| 3,689,501 A | 9/1972 | Weaver et al. |
| 3,816,392 A | 6/1974 | Weaver et al. |
| 4,115,056 A | 9/1978 | Koller et al. |
| 4,359,570 A | 11/1982 | Davis et al. |
| 4,403,092 A | 9/1983 | Davis et al. |
| 4,617,373 A | 10/1986 | Pruett et al. |
| 4,740,581 A | 4/1988 | Pruett et al. |
| 4,745,173 A | 5/1988 | Weaver et al. |
| 4,804,719 A | 2/1989 | Weaver et al. |
| 4,892,922 A | 1/1990 | Weaver et al. |
| 4,943,617 A | 7/1990 | Etzbach et al. |
| 5,030,706 A | 7/1991 | Harris et al. |
| 5,055,602 A | 10/1991 | Melpolder |
| 5,102,980 A | 4/1992 | Krutak et al. |
| 5,109,097 A | 4/1992 | Klun et al. |
| 5,194,571 A | 3/1993 | Weaver et al. |
| 5,274,072 A | 12/1993 | Weaver et al. |
| 5,281,659 A | 1/1994 | Weaver et al. |
| 5,362,812 A | 11/1994 | Holmes et al. |
| 5,367,039 A | 11/1994 | Valbuuchi et al. |
| 5,372,864 A | 12/1994 | Weaver et al. |
| 5,578,419 A | 11/1996 | Itoh et al. |
| 5,616,779 A * | 4/1997 | Arndt .......................... 560/48 |
| 5,650,456 A | 7/1997 | Yun et al. |
| 5,962,557 A | 10/1999 | Weaver et al. |
| 6,143,480 A | 11/2000 | Obayashi et al. |
| 6,197,223 B1 | 3/2001 | Weaver et al. |

FOREIGN PATENT DOCUMENTS

| DE | 195 05 940 | 8/1996 |
| EP | 0 322 808 | 7/1989 |
| GB | 1006884 | 10/1965 |
| JP | 144004 | 5/2000 |
| WO | WO 96/01283 | 1/1996 |
| WO | WO 97/48744 | 12/1997 |
| WO | WO 98/02492 | 1/1998 |
| WO | WO 98/23690 | 6/1998 |
| WO | WO 98/33865 | 8/1998 |
| WO | WO 98/33866 | 8/1998 |

OTHER PUBLICATIONS

Journal of the Society of Dyes and Colourists (J.S.D.C.), Apr. 1977, pp. 114-125.
Chemistry and Technology of UV and EB Formulation for Coatings, Inks and Paints, vol. II: Prepolymers and Reactive Diluents, G. Webster, John Wiley & Sons, London, 1997.

* cited by examiner

Primary Examiner—Charanjit S. Aulakh
(74) Attorney, Agent, or Firm—Bernard J. Graves, Jr.; Brett L Nelson

(57) ABSTRACT

Disclosed are novel colorant compounds which contain one or more ethylenically-unsaturated (vinyl), photopolymerizable radicals which may be copolymewrized (or cured) with ethylenically-unsaturated monomers to produce colored compositions such as colored acrylic coatings and polymers, e.g., coatings and polymers produced from acrylate and methacrylate esters, colored polystyrenes, and similar colored polymeric materials derived from other ethylenically-unsaturated monomers. The present invention also pertains to processes for the preparation of certain of the photopolymerizable colorant compounds.

7 Claims, No Drawings

COLORANT COMPOUNDS CONTAINING COPOLYMERIZABLE VINYL GROUPS

CROSS REFERENCE TO RELATED APPLICATION

This application is a divisional application of U.S. application Ser. No. 09/920,904, filed on Aug. 2, 2001 which has now issued as U.S. Pat. No. 6,727,372, and which claims the benefit of U.S. Provisional Application Ser. No. 60/223,521 filed Aug. 7, 2000.

FIELD OF THE INVENTION

This invention pertains to certain novel colorant compounds which contain one or more ethylenically-unsaturated (vinyl), photopolymerizable radicals which may be copolymerized (or cured) with ethylenically-unsaturated monomers to produce colored compositions such as colored acrylic polymers, e.g., polymers produced from acrylate and methacrylate esters, colored polystyrenes, and similar colored polymeric materials derived from other ethylenically-unsaturated monomers. The present invention also pertains to processes for preparing certain of the photopolymerizable colorant compounds.

BACKGROUND AND PRIOR ART

It is known (J.S.D.C., April 1977, pp 114–125) to produce colored polymeric materials by combining a reactive polymer such terepolymers having epoxy groups or polyacryloyl chloride with anthraquinone dyes containing nucleophilic reactive groups such as amino or hydroxy groups; to graft acryloylaminoanthraquinone dyes to the backbone of vinyl or divinyl polymers; and to polymerize anthraquinone dyes containing certain olefinic groups to produce polymeric dyes/pigments. U.S. Pat. No. 4,115,056 describes the preparation of blue, substituted 1,4-diaminoanthraquinone dyes containing one acryloyloxy group and and the use of the dyes in coloring various fibers, especially polyamide fibers. U.S. Pat. No. 4,943,617 discloses liquid crystalline copolymers containing certain blue, substituted 1,5-diamino-4,8-dihydroxyanthraquinone dyes containing an olefinic group copolymerized therein to provide liquid crystal copolymers having high dichromism. U.S. Pat. No. 5,055,602 describes the preparation of certain substituted 1,4-diaminoanthraquinone dyes containing polymerizable acryloyl and methacryloyl groups and their use in coloring polyacrylate contact lens materials by copolymerizing.

U.S. Pat. No. 5,362,812 discloses the conversion of a variety of dye classes, including anthraquinones, into polymeric dyes by (a) polymerizing 2-alkenylazlactones and reacting the polymer with dyes containing nucleophilic groups and by (b) reacting a nucleophilic dye with an alkenylazlactone and then polymerizing the free radically polymerizable dyes thus produced. The polymeric dyes are reported to be useful for photoresist systems and for color-proofing. U.S. Pat. No. 5,367,039 discloses a process for preparing colored vinyl polymers suitable for inks, paints, toners and the like by emulsion polymerization of a vinyl monomer with reactive anthraquinone dyes prepared by functionalizing certain anthraquinone dyes with methacryloyl groups.

The preparation of a variety of dyes, including some anthraquinones, which contain photopolymerizable groups and their use for color filters suitable for use in liquid crystal television sets, color copying machines, photosensitive resist resin compositions, and the like are described in U.S. Pat. No. 5,578,419.

BRIEF SUMMARY OF THE INVENTION

The first embodiment of the present invention concerns colorant compounds having Formulas I and II:

$$A-(CO_2-X)_n \qquad \text{I}$$

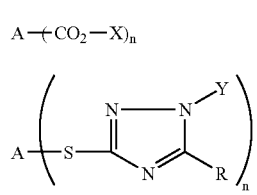

wherein

A, is a mono-, di-, tri- or tetravalent chromophore;

X is $-R_1-O-Q$ or the photopolymerizable group $-CH_2-C_6H_4\text{-p-}C(R_2)=CH_2$;

Y is $-R_1-O-Q$, $-CH_2-C_6H_4\text{-p-}C(R_2)=CH_2$ or Q;

R is selected from hydrogen, $C_1-C_6$ alkyl, aryl and $C_3-C_8$ cycloalkyl;

$R_1$ is selected from $C_2-C_8$ alkylene, $-(-CH_2CH_2O-)_m-CH_2CH_2-$ and 1,4-cyclohexylenedimethylene;

$R_2$ is selected from hydrogen and $C_1-C_6$ alkyl;

n is 1 to 4;

m is 1–3;

Q is a photopolymerizable group selected from an organic radical having the formulae:

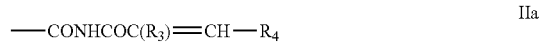

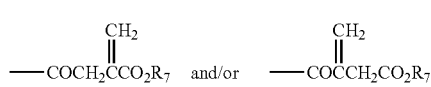

wherein $R_3$ is selected from hydrogen or $C_1$–$C_6$ alkyl;

$R_4$ is selected from hydrogen; $C_1$–$C_6$ alkyl; phenyl; phenyl substituted with one or more groups selected from $C_1$–$C_6$ alkyl, $C_1$–$C_6$ alkoxy, —N($C_1$–$C_6$ alkyl)$_2$, nitro, cyano, $C_2$–$C_6$ alkoxycarbonyl, $C_2$–$C_6$ alkanoyloxy and halogen; 1- and 2-naphthyl; 1- and 2-naphthyl substituted with $C_1$–$C_6$ alkyl or $C_1$–$C_6$ alkoxy; 2- and 3-thienyl; 2- and 3-thienyl substituted with $C_1$–$C_6$ alkyl or halogen; 2- and 3-furyl; and 2- and 3-furyl substituted with $C_1$–$C_6$ alkyl;

$R_5$ and $R_6$ are independently selected from hydrogen, $C_1$–$C_6$ alkyl, substituted $C_1$–$C_6$ alkyl; aryl; or $R_5$ and $R_6$ may be combined to represent a —(—$CH_2$—)$_{3-5}$— radical;

$R_7$ is selected from hydrogen or a group selected from $C_1$–$C_6$ alkyl, substituted $C_1$–$C_6$ alkyl, $C_3$–$C_8$ alkenyl, $C_3$–$C_8$ cycloalkyl and aryl; and $R_8$ is selected from hydrogen, $C_1$–$C_6$ alkyl and aryl. The colorant compounds have good color strength, good solubility in the reactive monomers and good light-fastness. Certain of the colorant compounds exhibit outstanding thermal stability.

A second embodiment of the present invention concerns a process for preparing photopolymerizable colorants having Formula I, wherein X is a p-vinylbenzyl radical having the formula —$CH_2$—$C_6H_4$-p-$C(R_2)$=$CH_2$ which comprises reacting colored acidic compounds having the structure:

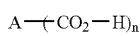

with the compounds having the structure $ClCH_2$—$C_6H_4$-p-$C(R_2)$=$CH_2$ in the presence of base, wherein A, $R_2$ and n are as defined previously.

A third embodiment of the present invention concerns a process for preparing photopolymerization colorants having Formula II, wherein Y is a p-vinylbenzyl radical having the formula —$CH_2$—$C_6H_4$-p-$C(R_2)$=$CH_2$ which comprises reacting colored acidic compounds having the structure

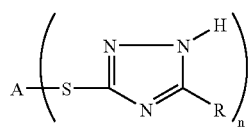

with 4-chloromethylstyrene compounds having the structure $ClCH_2$—$C_6H_4$-p-$C(R_2)$=$CH_2$ in the presence of a base, wherein A, R, $R_2$ and n are defined above.

A fourth embodiment of the invention concerns a process for preparing colored photopolymerizable compounds having Formula I and Formula II, respectively, wherein X and Y are —$CH_2CH_2$—O—Q or —$CH_2CH(CH_3)$—O—Q, which comprises the steps of (a) reacting a colored acidic compounds having the structures:

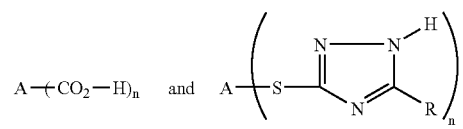

respectively, with at least about n molecular equivalents of ethylene or propylene carbonate for each molecular equivalent of acidic compounds to produce the 2-hydroxyalkyl derivatives of said acidic compounds followed by:

(b) reaction of said colored hydroxyalkyl derivatives with about n molecular equivalents of one or more acylating agents having the structures

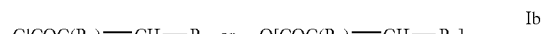

Ib

IIb

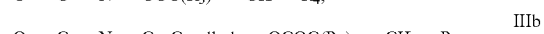

IIIb

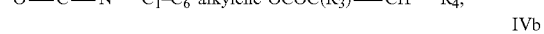

IVb

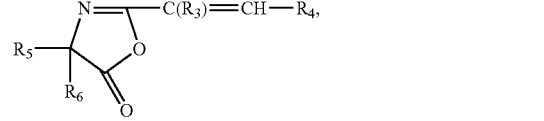

Vb

VIb

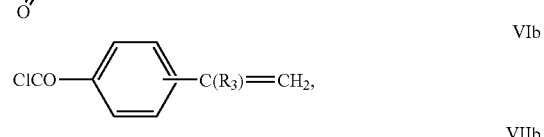

VIIb

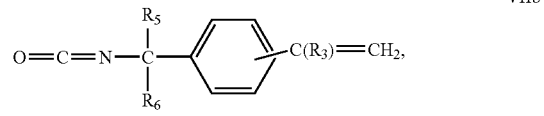

VIIIb

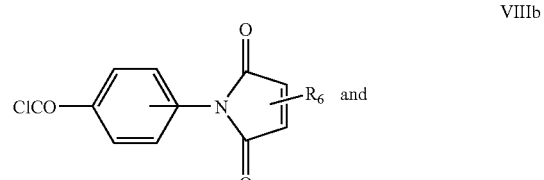

IXb

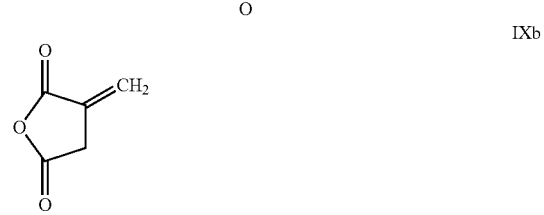

wherein A, n, Q, R, $R_3$, $R_4$, $R_5$, $R_6$, $R_8$ are defined previously.

A fifth embodiment of the present invention concerns a process for preparing compounds of Structure II, wherein Y is a photopolymerizable group Q which comprises reacting colored acidic compounds having the structure:

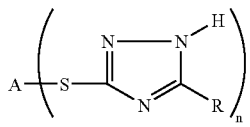

with at least about n molecular equivalents of one or more acylating agents Ib through IXb described above wherein A, R, n and Q are defined above.

A sixth embodiment of the present invention pertains to a coating composition comprising (i) one or more polymerizable vinyl compounds, (ii) one or more of the colorant compounds having Formulas I and II described above, and (iii) a photoinitiator. A seventh embodiment of the present invention pertains to a polymeric composition, typically a coating, comprising a polymer of one or more acrylic acid esters, one or more methacrylic acid esters and/or other polymerizable vinyl compounds, having copolymerized therein one or more of the colorant compounds having Formulas I and II described above.

DETAILED DESCRIPTION

In formulas I and II, A represents a mono-, di-, tri- or tetravalent residue of a chromophore, i.e., a colored compound, including residues which in combination with —$CO_2X$ produces a chromophore. Examples of the chromophoric residues which A may represent include anthraquinone, anthrapyridone (3H-dibenz-[f,ij]-isoquinoline-2,7-dione, anthrapyrimidine (7H-dibenz-[f,ij]-isoquinoline-7-one), anthrapyrimidine (7H-benzo[e]-perimidine-7-one), anthrapyrimidone, isothiazoloanthrone, azo, bis-azo, methine, bis-methine, coumarin (2-H-1-benzopyran-2-one), 3-aryl-2,5-dioxypyrroline, 3-aryl-5-dicyanomethylene-2-oxypyrroline, perinone, quinophthalone, phthalocyanine, metal phthalocyanine, nitroarylamine or a 2,5-diarylaminoterephthalic ester chromophore.

The terms "$C_1$–$C_6$-alkyl" and "$C_1$–$C_8$-alkyl" are used herein to denote a straight- or branched-chain, saturated, aliphatic hydrocarbon radical containing one to six, and one to eight, carbon atoms. The term "substituted $C_1$–$C_6$-alkyl" is used to denote a $C_1$–$C_6$-alkyl group substituted with one or more groups, preferably one to three groups, selected from the group consisting of hydroxy, halogen, cyano, aryl, aryloxy, arylthio, $C_1$–$C_6$ alkylthio, $C_3$–$C_8$-cycloalkyl, $C_2$–$C_6$-alkanoyloxy and —(—O—$R_9$—)$_p$—$R_{10}$ wherein $R_9$ is selected from the group consisting of $C_1$–$C_6$ alkylene, $C_1$–$C_6$-alkylene-arylene, cyclohexylene, arylene, $C_1$–$C_6$-alkylene-cyclohexylene and $C_1$–$C_6$-alkylene-cyclohexylene-$C_1$–$C_6$-alkylene, $R_{10}$ is selected from the group consisting of hydrogen, hydroxy, carboxy, $C_2$–$C_6$-alkanoyloxy, $C_2$–$C_6$-alkoxycarbonyl, aryl and $C_3$–$C_8$-cycloalkyl; and p is 1, 2, or 3.

The terms "$C_1$–$C_6$-alkylene", "$C_2$–$C_4$-alkylene" and "$C_2$–$C_8$-alkylene" are used to denote straight- or branched-chain, divalent, aliphatic hydrocarbon radicals containing one to six, two to four, and two to eight carbons, respectively. These divalent radicals may be substituted with one to three groups selected from $C_1$–$C_6$-alkoxy, $C_2$–$C_6$-alkoxycarbonyl, $C_2$–$C_6$-alkanoyloxy, hydroxy, aryl and halogen. The term "$C_3$–$C_8$-alkenyl" is used to denote an aliphatic hydrocarbon radical containing at least one double bond. The term "$C_3$–$C_8$-alkynyl" is used to denote an aliphatic hydrocarbon radical containing at least one triple bond and three to eight carbon atoms. The term "$C_3$–$C_8$-cycloalkyl" is used to denote a saturated, carbocyclic, hydrocarbon radical having three to eight carbon optionally substituted with one to three $C_1$–$C_6$-alkyl group(s). The term "$C_3$–$C_8$-cycloalkylene" is used to denote a divalent, carbocyclic hydrocarbon radical which contains three to eight carbon atoms, preferably five or six carbons.

The term "aryl" as used herein denotes phenyl and phenyl substituted with one to three substituents selected from $C_1$–$C_6$-alkyl, substituted $C_1$–$C_6$-alkyl, $C_1$–$C_6$-alkoxy, halogen, carboxy, cyano, $C_2$–$C_6$-alkanoyloxy, $C_1$–$C_6$-alkylthio, $C_1$–$C_6$-alkylsulfonyl, trifluoromethyl, hydroxy, optionally substituted sulfamoyl, $C_2$–$C_6$-alkoxycarbonyl, $C_2$–$C_6$-alkanoyl-amino and —O—$R_{11}$, S—$R_{11}$, —$SO_2$—$R_{11}$, —$NHSO_2R_{11}$ and —$NHCO_2R_{11}$, wherein $R_{11}$ is phenyl or phenyl substituted with one to three groups selected from $C_1$–$C_6$-alkyl, $C_1$–$C_6$-alkoxy and halogen. The term "arylene" as used herein denotes includes 1,2-, 1,3- and 1,4-phenylene and such divalent radicals substituted with one to three groups selected from $C_1$–$C_6$-alkyl, $C_1$–$C_6$-alkoxy and halogen.

The term "halogen" is used to include fluorine, chlorine, bromine, and iodine. The term "optionally substituted sulfamoyl" is used to describe the group having the structure —$SO_2N(R_{12})R_{13}$, wherein $R_{12}$ and $R_{13}$ are independently selected from hydrogen, $C_1$–$C_6$-alkyl, substituted $C_1$–$C_6$-alkyl, $C_3$–$C_8$-alkenyl, $C_3$–$C_8$-cycloalkyl, aryl and heteroaryl.

The terms "$C_1$–$C_6$-alkoxy", "$C_2$–$C_6$-alkoxycarbonyl", "$C_2$–$C_6$-alkanoyl", "$C_2$–$C_6$-alkanoyloxy" and "$C_2$–$C_6$-alkanoylamino" are used to denote radicals corresponding to the structures —$OR_{14}$, —$CO_2R_{14}$, —$COR_{14}$, —$OCOR_{14}$ and $NHCOR_{14}$, respectively, wherein $R_{14}$ is $C_1$–$C_6$-alkyl or substituted $C_1$–$C_6$-alkyl. The term "heteroaryl" as used herein denotes a 5- or 6- membered aromatic ring containing one to three hetero atom selected from oxygen, sulfur and nitrogen. Examples of such heteroaryl groups are thienyl, furyl, pyrrolyl, imidazolyl, pyrazolyl, thiazolyl, isothiazolyl, oxazolyl, isoxazolyl, triazolyl, thiadiazolyl, oxadiazolyl, tetrazolyl, pyridyl, pyrimidyl, benzoxazolyl, benothiazolyl, benzimidazolyl, indolyl and the like and these optionally substituted with one to three groups selected from $C_1$–$C_6$-alkyl, $C_1$–$C_6$-alkoxy, substituted $C_1$–$C_6$-alkyl, halogen, $C_1$–$C_6$-alkylthio, aryl, arylthio, aryloxy, $C_2$–$C_6$-alkoxycarbonyl and $C_2$–$C_6$-alkanoylamino.

The preferred azo dyes of the invention encompassed by Formula I have the following general Formula XIII:

$$D-N=N-Z \qquad\qquad XIII$$

wherein D is the residue of an aromatic or heteroaromatic, diazotizable amine which has been diazotized and coupled with an electron rich coupling component H-Z and is preferably derived from the aromatic and heteroaromatic classes of unsubstituted and substituted anilines, 1-naphthylamines, 1-aminoanthraquinones, 4-aminoazobenzenes, 2-aminothiazoles, 2-aminobenzothiazoles, 3-amino-2,1-benzisothiazoles, 2-aminothieno[2,3-d]thiazoles, 5-aminopyrazoles, 4-aminopyrazoloisothiazoles, 2-amino-1,3,4-thiadiazoles, 5-amino-1,2,3-thiadiazoles, 5-amino-1,2,3-triazoles, 2-amino-1,3,4-triazoles, 2(5) aminoimidazoles, 3-aminopyridines, 2(3)aminothiophenes, 2(3)aminobenzo[5]thiophenes, 2-aminothieno[3,2-5]thiophenes, 3-aminothieno[2,3]-isothiazoles, 3-amino-7-benz-2,1-isothiazoles, 3-aminoisothiazolo[3,4-d]pyridines, 3(4)-aminophthalimides and 5(6)amino-1,2-benzisothiazolon-1,1-dioxides; wherein the substituuents which are present on D are selected from $C_1$–$C_6$-alkyl; $C_1$–$C_6$-alkoxy; $C_3$–$C_8$-cycloalkyl; halogen; $C_2$–$C_6$-alkoxycarbonyl;

$C_2$–$C_6$-alkanoyloxy; formyl; $C_2$–$C_6$-alkanoyl; dicyanovinyl; thiocyano; trifluoromethyl; trifluoroacetyl; cyano; carbamoyl; —CONHC$_1$–C$_6$-alkyl; —CON(C$_1$–C$_6$-alkyl)$_2$; —CONH aryl; sulfamoyl; —SO$_2$NHC$_1$–C$_6$-alkyl; —SO$_2$N (C$_1$–C$_6$-alkyl)$_2$; —SO$_2$NHaryl; —SO$_2$NHC$_3$–C$_8$-cycloalkyl; —CONHC$_3$–C$_8$-cycloalkyl; aryl; aroyl; heteroaryl; NHSO2C$_1$–C$_6$ alkyl; N(C$_1$–C$_6$-alkyl) SO$_2$C$_1$–C$_6$-alkyl; NHSO$_2$ aryl; NHCO$_2$C$_1$–C$_6$-alkyl; NHCONH C$_1$–C$_6$-alkyl; NHCONH aryl; —N—(C$_1$–C$_6$-alkyl)-aryl; arylazo; aryloxy; arylthio; $C_3$–$C_8$-cycloalkoxy; heteroarylazo; heteroarylthio; arylsulfonyl; tricyanovinyl; aryloxysulfonyl; $C_1$–$C_6$-alkylsulfonyl; fluorosulfonyl; trifluoromethylsulfonyl; hydroxy; nitro and —CH=AM wherein AM is the residue of an active methylene compound; —CO$_2$X and

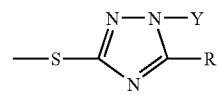

wherein —L— is a linking group selected from —O—, —S— and —SO$_2$— and X is as defined previously; Z is the residue of an electron rich coupling component selected from the classes of anilines, 1,2,3,4-tetrahydroquinolines, aminonaphthylamines, benzomorpholines (3,4-dihydro-2H-1,4-benzoxazines), pyrazolones, pyrazoles, 3-cyano-6-hydroxy-2-pyridones, 2,3-dihydroindoles, indoles, 4-hydroxycoumarins, 4-hydroxy-2-quinolones, imidazo[2,1-b]-thiazoles, 2,6-diamino-3-cyanopyridines; 5,5-dimethyl-1,3-cyclohexanedione (dimedone), phenols, naphthols and 2,4-pentanediones; wherein the azo compounds of Formula XIII contain a total of from one to four photopolymerizable groups (—CO$_2$X), wherein said group(s) may be positioned on moiety D and/or moiety Z.

Another group of preferred azo dye of the invention encompassed by Formula II have the general Formula XIV:

$$D_1\text{—N=N—}Z_1 \qquad \text{XIV}$$

wherein $D_1$ is the residue of an aromatic or hereroaromatic amine which has been diazotized and coupled with an electron rich coupling component HZ$_1$, wherein $D_1$ is derived from the same optionally substituted aromatic amines and heteroaromanic amines as described for Formula XIII above, except that the photopolymerizable group which may be present on $D_1$, is a triazolyl radical having the formula:

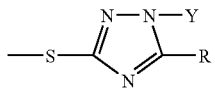

instead of —CO$_2$X or

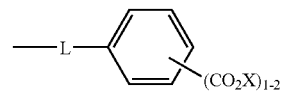

and wherein R and Y are as previously defined; $Z_1$ is the residue of a coupling component selected from the same classes as described above for Z in Formula XIII and which may be substituted with the group

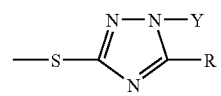

with the provision that the azo compounds of Formula XIV contain a total of from one to four photopolymerizable groups

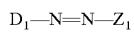

wherein said groups(s) may be positioned on moiety $D_1$ and/or moiety $Z_1$.

Typical coupler residues represented by Z above in Formula XIII include the groups having the structures:

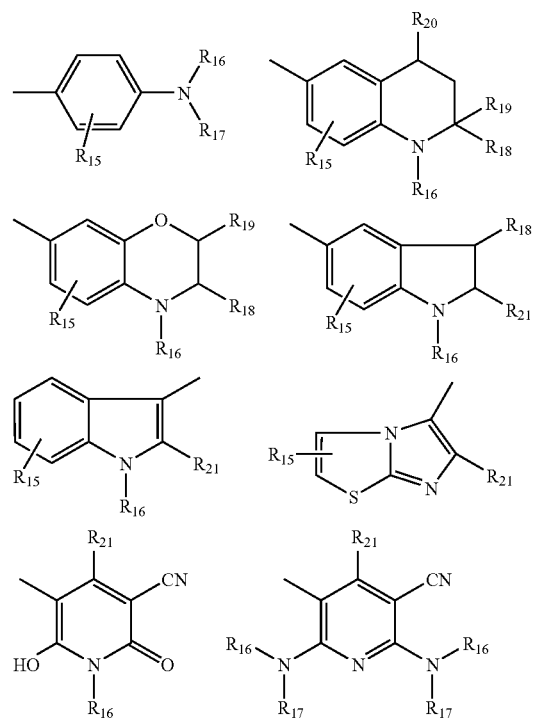

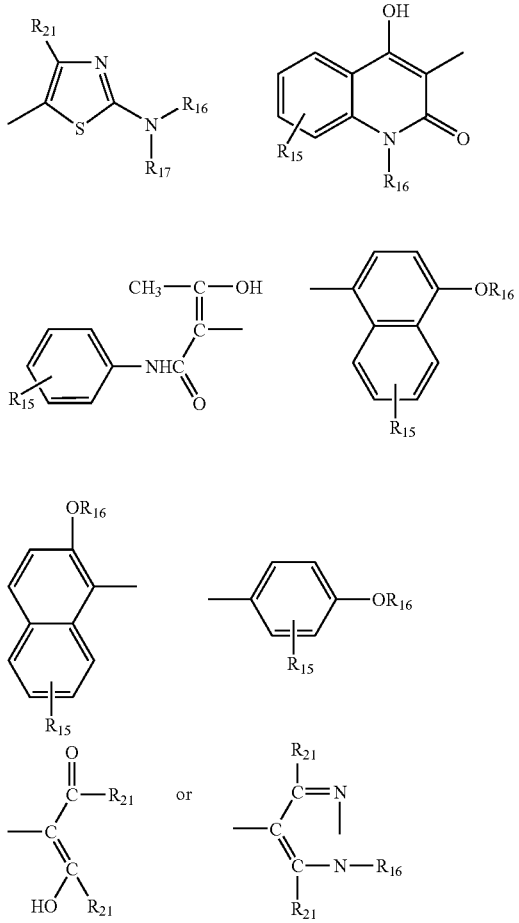

wherein $R_{15}$ is hydrogen or 1–2 groups selected from $C_1$–$C_6$-alkyl, $C_1$–$C_6$-alkoxy, halogen, NHCOR$_{22}$, NHCO$_2$R$_{22}$, NHCON(R$_{22}$)R$_{23}$ and NHSO$_2$R$_{23}$, wherein $R_{22}$ is selected from hydrogen, $C_1$–$C_6$-alkyl, $C_3$–$C_8$-cycloalkyl and aryl, $R_{23}$ is selected from $C_1$–$C_5$-alkyl, $C_3$–$C_8$-cycloalkyl and aryl, wherein each $C_1$–$C_6$ alkyl group in $R_{22}$ and $R_{23}$ may be further substituted with one or more groups selected from $C_1$–$C_6$-alkoxy, hydroxy, $C_3$–$C_8$-cycloalkyl, aryl, aryloxy, arylthio, cyano, succinimido, —CO$_2$X,

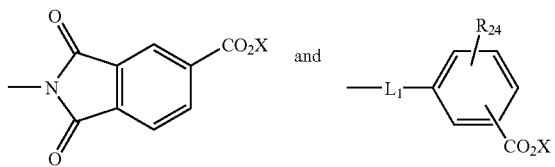

wherein —CO$_2$X is a photopolymerizable group as described above; $L_1$ is selected from a covalent bond, —O—, —S—, —SO$_2$—, —CO$_2$—, —SO$_2$NH—, —CONH— and —SO$_2$N(C$_1$-C$_6$-alkyl)-; wherein each aryl group in $R_{22}$ and $R_{23}$ in the definition of $R_{15}$ may be substituted with at least one photopolymerizable —CO$_2$X group; wherein $R_{24}$ represents hydrogen or 1–2 groups selected from —CO$_2$X, $C_1$–$C_6$-alkyl, $C_1$–$C_6$-alkoxy and halogen; $R_{16}$ and $R_{17}$ are independently selected from hydrogen; $C_3$–$C_8$-cycloalkyl; $C_3$–$C_8$-alkenyl; $C_3$–$C_8$-alkynyl; $C_1$–$C_6$-alkyl and $C_1$–$C_6$-alkyl substituted with one or more groups selected from —CO$_2$X,

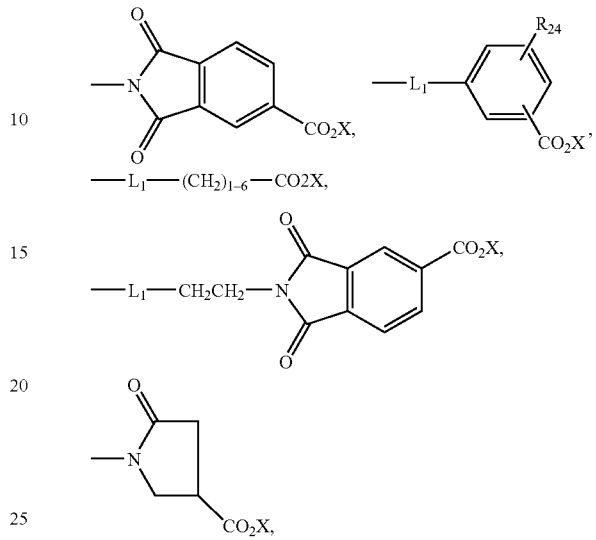

$C_3$–$C_8$-cycloalkyl, aryl, hydroxy, cyano, —OC$_2$H$_4$OH, —SCH$_2$CH$_2$OH, halogen, —OC$_1$–C$_6$-alkyl, —SC$_1$–C$_6$-alkyl, —O aryl, —S aryl, —SO$_2$ aryl, —SO$_2$C$_1$–C$_6$-alkyl, —S heteroaryl, 2-pyrrolidino, phthalimidino, phthalmido, succinimido, glutarimido, o-benzoic sulfimido, —NHCOC$_1$–C$_6$-alkyl, —NHCOH, —NHSO$_2$C$_1$–C$_6$-alkyl, —NHSO$_2$aryl, —NHCOaryl, —NHCO$_2$C$_1$–C$_6$-alkyl, —SO$_2$NH$_2$, —CONH$_2$, —SO$_2$NH—C$_1$–C$_6$-alkyl, —SO$_2$N(C$_1$–C$_6$-alkyl)$_2$, —CO$_2$C$_1$–C$_6$-alkyl, —CONH C$_1$–C$_6$-alkyl, —CO$_2$-aryl, —CON—(C$_1$–C$_6$-alkyl)$_2$, —CONH-aryl, —CON—(C$_1$–C$_6$-alkyl)aryl, —SO$_2$N(C$_1$–C$_6$-alkyl)aryl, —OCOC$_1$–C$_6$-alkyl, —OCOaryl, —OCO$_2$C$_1$–C$_6$-alkyl; groups of the formulae:

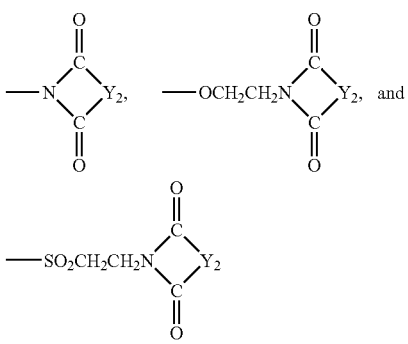

wherein $Y_2$ is selected from 1,2-phenylene; 1,2-phenylene substituted with $C_1$–C$_6$ alkyl, $C_1$–C$_6$-alkoxy, halogen, CO$_2$C$_1$–C$_6$-alkyl or nitro; $C_2$–C$_4$ alkylene; —OCH$_2$—; —SCH$_2$—; —CH$_2$OCH$_2$—; —CH$_2$SCH$_2$—; —NHCH$_2$—; —NHCH$_2$CH$_2$—N(C$_1$–C$_6$-alkyl)CH$_2$—; —N(C$_1$–C$_6$-alkyl)CH$_2$CH$_2$; —NHC(aryl)$_2$, and wherein $R_{16}$ and $R_{17}$ may be combined with themselves or another element to which they are attached to form a radical Z having the formula:

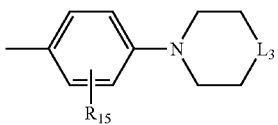

wherein $L_3$ is selected from a covalent bond, —O—, —S—, —CH$_2$—, —SO$_2$—, —N(COC$_1$–C$_6$-alkyl)-, —N(SO$_2$C$_1$–C$_6$-alkyl)-, —N(COaryl)- and —N(SO$_2$aryl)-; $R_{18}$, $R_{19}$ and $R_{20}$ are independently selected from hydrogen and $C_1$–$C_6$-alkyl; $R_{21}$ is selected from hydrogen, $C_1$–$C_6$-alkyl and aryl.

Typical coupler residue represented by $Z_1$ is Formula XIV include those mentioned immediately above Z except that the photopolymerizable group which may be present as a substituent or on $R_{15}$, $R_{16}$, $R_{17}$, $R_{22}$, or $R_{23}$ is the triazolyl group having the formula:

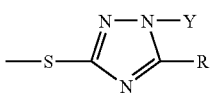

instead of those listed.

The preferred methine, bis-methine, 3-aryl-2,5-dioxypyrroline, 3-aryl-5-dicyanomethylene-2-oxypyrroline and coumarin compounds of Formula I have the following general Formulas XV, XVI, XVII, XVIII and XIX respectively;

     XV

     XVI

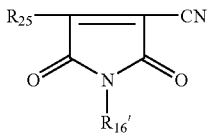     XVII

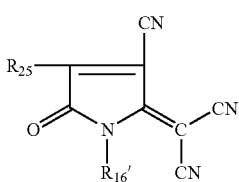     XVIII

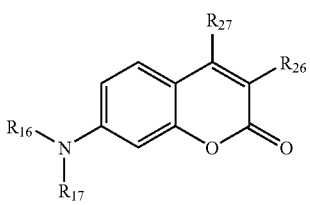     XIX wherein $R_{25}$ is an electron rich aromatic residue selected from the following:

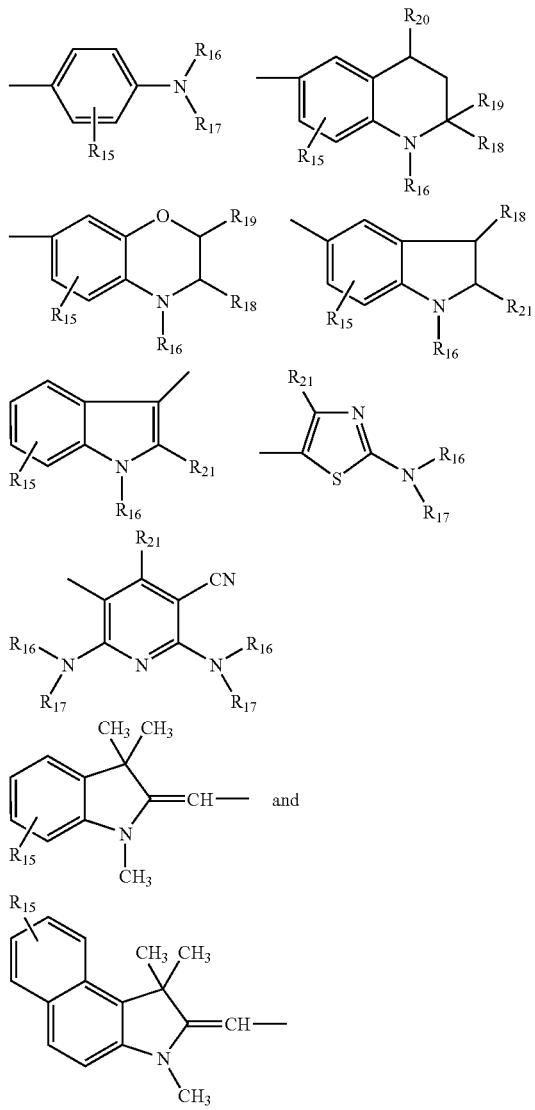

wherein $R_{16}$, $R_{17}$, $R_{18}$, $R_{19}$, $R_{20}$ and $R_{21}$ are as defined for Z previously in Formula XIII; wherein $R_{16}'$ is selected from the same groups as $R_{16}$; wherein $R_{26}$ is selected from cyano, $C_1$–$C_6$-alkoxycarbonyl, $C_1$–$C_6$-alkylsulfonyl, arylsulfonyl, aryl, heteroaryl, formyl, $C_1$–$C_6$-alkanoyl or —CH=AM; wherein $R_{27}$ is hydrogen or cyano; wherein AM is the residue of an active methylene compound selected from malononitrile, α-cyanoaceticacid esters, malonic acid esters, α-cyanoacetic acid amides, α-$C_1$–$C_6$-alkylsulfonyl-acetonitriles, α-arylsulfonylacetonitriles, α-$C_1$–$C_6$-alkanoylacetonitriles, α-arylsulfonylacetonitriles, α-$C_1$–$C_6$-alkanoylacetonitriles, α-arylacetonitriles, α-hereroacylacetonitriles, bis (heteroaryl) methanes, 1,3-indanediones, 2-furanones, benzo-2-furanones, benzo (b) thieno-3-xlidene propanedinitrile-5,5-dioxides, 1,3-bis(dicyanomethylene)indanes, barbituric acid, 5-pyrazolones, dimedone, 3-oxo-2,3-dihydro-1-benzothiophene-1,1-dioxides, aryl C(CH$_3$)=C(CN)$_2$ and NC CH$_2$ CO$_2$X, $R_{28}$; wherein —CO$_2$X is a photopolymerizable group as previouly defined.

Examples of the anthraquinone (Formulas XX a–e), anthrapyridone (3H-dibenz-[f,ij]-isoquinoline-2-7-dione)

(Formulas XXI a–e) and anthrapyridine (7H-dibenz-[f,ij]-isoquinoline-7-one) (Formulas XXII a–e) colorants include the compounds having the structures set forth below:

-continued

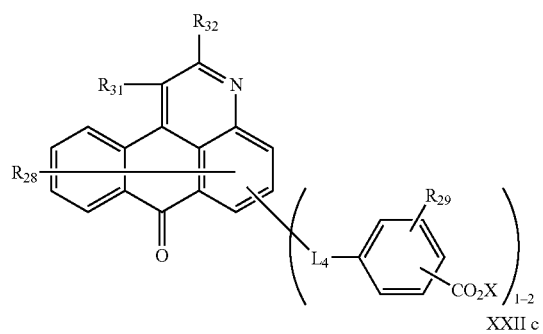
XXII b

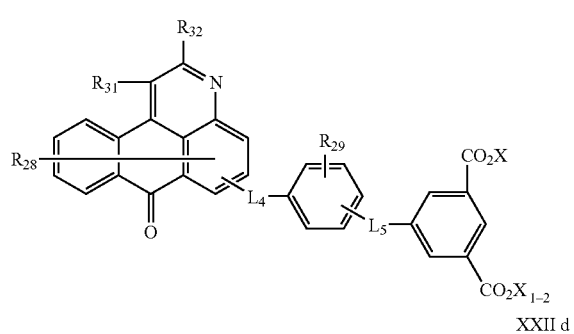
XXII c

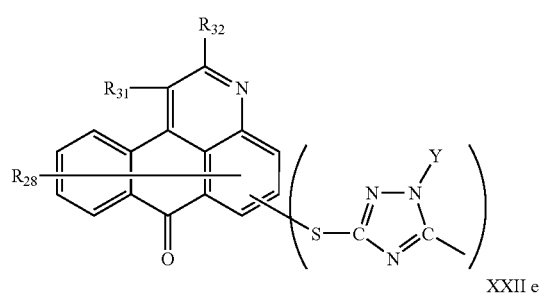
XXII d

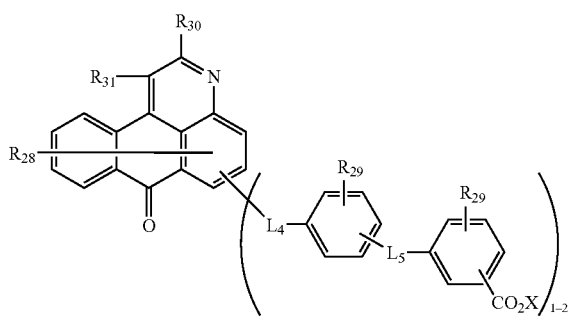
XXII e wherein $R_{28}$ is hydrogen or represents 14 groups selected from amino; $C_1$–$C_8$-alkylamino; $C_1$–$C_8$-alkylamino substituted with one or more groups selected from hydroxy, cyano, halogen, aryl, heteroaryl, $C_3$–$C_8$-cycloalkyl, furyl, $C_1$–$C_6$-alkoxy, $C_1$–$C_6$-alkylthio, arylthio, aryloxy, —(OCH$_2$CH$_2$—)$_{1-3}$OR', wherein R' is selected from hydrogen, $C_1$–$C_6$-alkyl and $C_2$–$C_6$-alkanoyloxy; $C_3$–$C_8$-cycloalkylamino; $C_3$–$C_8$-alkenylamino; $C_3$–$C_8$-alkynylamino; arylamino; furfurylamino; $C_1$–$C_6$-alkoxy; —(OCH$_2$CH$_2$—)$_{1-3}$OR', wherein R' is as defined previously; halogen; hydroxy; $C_1$–$C_6$-alkylthio; arylthio; aryl; aryloxy; arylsulfonyl $C_2$–$C_6$-alkanoyl; aroyl; $C_2$–$C_6$-alkanoyloxy; $C_2$–$C_6$-alkoxycarbonyl; heteroaryl; heteroarylthio; cyano; nitro; trifluoromethyl; thiocyano;

—SO$_2$C$_1$–C$_6$-alkyl; —SO$_2$NH$_2$; —SO$_2$NHC$_1$–C$_6$-alkyl; —SO$_2$N(C$_1$–C$_6$alkyl)$_2$; —SO$_2$N(C$_1$–C$_6$alkyl)aryl; —SO$_2$NHaryl; —CONH$_2$; CONHC$_1$–C$_6$-alkyl; —CON(C$_1$–C$_6$-alkyl)$_2$; —CONHaryl; —CON(C$_1$–C$_6$-alkyl)aryl; C$_1$–C$_6$-alkyl; tetrahydrofurfurylamino; 4-(hydroxymethyl)cyclohexylmethylamino; and

$R_{29}$ is hydrogen or 1–2 groups selected from $C_1$–$C_6$-alkyl, halogen and $C_1$–$C_6$-alkoxy; $R_{30}$ is selected from hydrogen, $C_1$–$C_8$-alkyl, substituted $C_1$–$C_8$-alkyl as defined previously in the definition of $R_{28}$, aryl and $C_3$–$C_8$-cycloalkyl; $R_{31}$ is selected from hydrogen, cyano, $C_1$–$C_6$-alkoxy, $C_1$–$C_6$-alkylthio, aryl, aryloxy, arylamino, arylthio, heteroaryl, heteroarylthio, halogen, $C_2$–$C_6$-alkoxycarbonyl, aroyl; $C_1$–$C_6$-alkylsulfonyl, arylsulfonyl and $C_1$–$C_6$-alkylamino; $R_{32}$ is selected from hydrogen, $C_1$–$C_6$-alkyl, aryl and —N($R_{33}$)$R_{34}$, wherein $R_{33}$ and $R_{34}$ are independently selected from hydrogen; $C_1$–$C_6$-alkyl; $C_1$–$C_6$-alkyl substituted with $C_2$–$C_6$-alkanoyloxy, aryl and $C_3$–$C_8$-cycloalkyl; aryl; $C_3$–$C_8$-cycloalkyl; wherein $R_{33}$ and $R_{34}$ may be combined to produce divalent radicals such as —(CH$_2$)—$_{4-6}$ and —CH$_2$CH$_2$—L$_6$—CH$_2$CH$_2$—, wherein $L_6$ is selected from —O—, —S—, —SO$_2$— and —N($R_{34}'$)—, wherein $R_{34}'$ is selected from hydrogen, $C_1$–$C_6$-alkyl, aryl, aroyl, $C_1$–$C_6$-alkanoyl, $C_1$–$C_6$-alkylsulfonyl and aryl-sulfonyl; $L_4$ and $L_5$ are selected from —O—, —S—, —SO$_2$—, —CON($R_{33}$)— and —SO$_2$N($R_{33}$)—.

Some of the preferred colorants encompassed by Formula I wherein A is a quinophthalone chromophore have the following Formula XXIII:

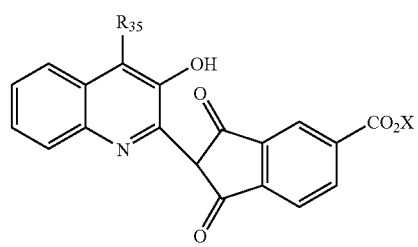
XXII wherein $R_{35}$ is selected from hydrogen, bromine, arylthio, heteroarylthio, arylsulfonyl,

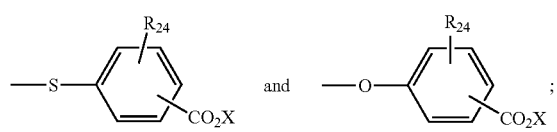

wherein X and $R_{24}$ are as defined above.

Some of the preferred nitroarylamine colorants encompassed by Formula I wherein A is a nitroarylamine chromophore have the following Formula (XXIV):

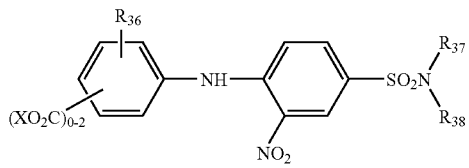

XXIV

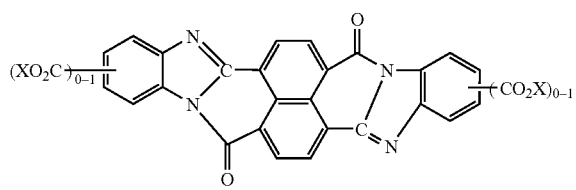

XXIX wherein $R_{36}$ is selected from hydrogen, halogen, $C_1$–$C_6$-alkyl and $C_1$–$C_6$-alkoxy; $R_{37}$ and $R_{38}$ are independently selected from hydrogen; $C_1$–$C_6$-alkyl; $C_3$–$C_6$-cycloalkyl; $C_3$–$C_8$-cycloalkyl; $C_3$–$C_8$-cycloalkyl, $C_2$–$C_6$-alkanoyloxy; aryl and

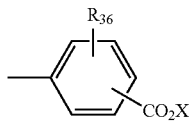

Some of the preferred colorants encompassed by Formula I wherein A is a perinone chromophore correspond to Formulae XXV–XXIX:

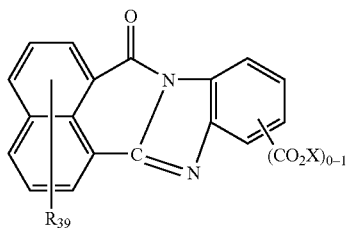

XXV

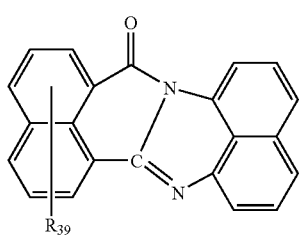

XXVI

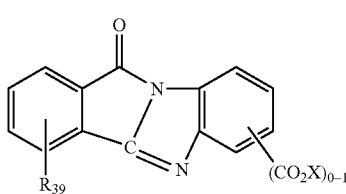

XXVII

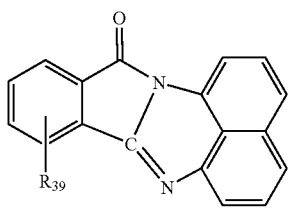

XXVIII wherein $R_{39}$ is hydrogen or 1–4 groups selected from $C_1$–$C_6$-alkyl, $C_1$–$C_6$-alkoxy, amino, $CO_2X$, $C_1$–$C_6$-alkylamino, $C_3$–$C_8$-cycloalkylamino, arylamino, arylthio, hereroarylthio and

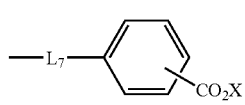

wherein $L_7$ is selected from —S—, —O— and —NH—, with the provision that one to four —$CO_2X$ groups be present.

Preferred colorants of Formula I containing the 2,5-diarylamino terephthalate chromophore have Formula XXX

XXX wherein $R_{40}$ is hydrogen or —$CO_2X$ or represents 1–3 groups selected from $C_1$–$C_6$-alkyl, $C_1$–$C_6$-alkoxy, halogen, and —NH$C_2$–$C_6$-alkanoylamino.

The preferred photopolymerizable colorant compounds of the present invention are those of Structures I and II where X and Y, respectively, are selected from —$CH_2CH_2OQ$, —$CH_2CH(CH_3)OQ$, —($CH_2CH_2O)_{2-3}$—$CH_2CH_2OQ$, —$CH_2C(CH_3)_2CH_2OQ$, and —$CH_2$—$C_6H_{10}$—$CH_2OQ$ and A is an anthraquinone, anthrapyridone or 2,5-diarylaminoterephthalate chromophore residue.

The photopolymerizable colorants having Formula I and II where X and Y are the photopolymerizable p-vinylbenzyl groups radical having the formula —$CH_2$—$C_6H_4$-p-C($R_2$)=$CH_2$ are prepared in general by reacting colored acidic compounds having Formulae III and IV with a 4-chloromethylstyreneV, respectively, as follows:

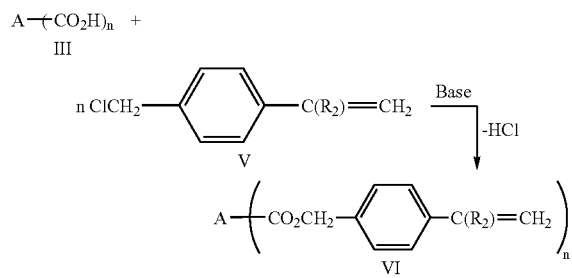

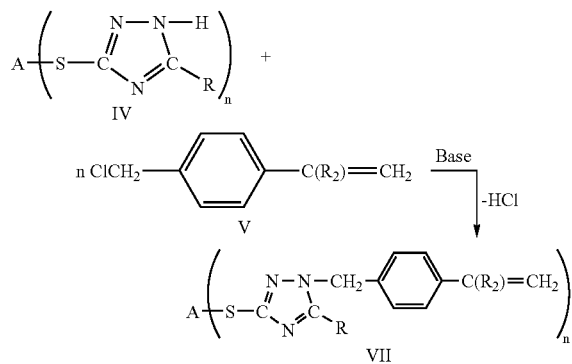

wherein A, n, R and $R_2$ are as defined previously, to produce colored compounds VI and VII. The reactions of the colored acidic compounds having Formulae III and IV with the 4-chloromethylstyrenes V are carried out in the presence of a polar aprotic solvent such as N,N-dimethylformamide (DMF) N-methyl-2-pyrrolidinone (NMP), N,N-dimethylacetamide (DMAC), sulfolane, etc. in the presence of one or more bases such as an alkali metal carbonate, an alkali metal bicarbonate, a trialkylamine, a cyclic nitrogen compounds such as 1,8-diazabicyclo[5.4.0]undec-7-ene (PBU), 1,5-diazabicyclo[4.3.0]non-5-ene (DBN), and the like. The reaction may under some reaction conditions be facilitated by the presence of a catalytic amount of an alkali metal bromide, alkali metal iodide and/or a conventional phase transfer catalysts, e.g., a tetraalkylammonium halide such as a chloride or bromide. The reactions are usually carried out between about 50° C. to about 150° C., preferably from about 90° C. to about 125° C.

The photopolymerizable dyes having Formulae I and II, where X and Y are —$R_1$—O—Q are, in general, prepared by first reacting colored acidic acidic compounds having Formulae III and IV with an alkylating agent containing one or more hydroxy groups having Formula VIII as follows:

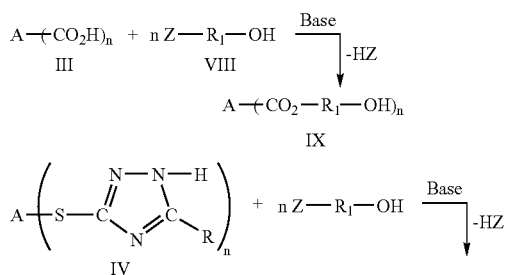

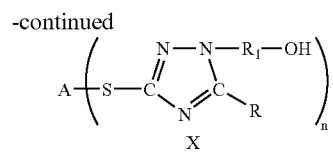

wherein A, n, R and $R_1$ are as defined previously and Z is halogen, to produce an intermediate hydroxy compound IX and X. Reaction conditions used for preparing compounds IX and X are those described in the preparation of VI and VII above. Although intermediate hydroxy compounds IX and X where $R_1$ is —$CH_2CH_2$— or —$CH_2CH(CH_3)$— may be prepared as described above by using the corresponding 2-bromo- or chloro-alkanol, the preferred route uses ethylene or propylene carbonate which avoids the use of toxic haloalkanols according to the following equations:

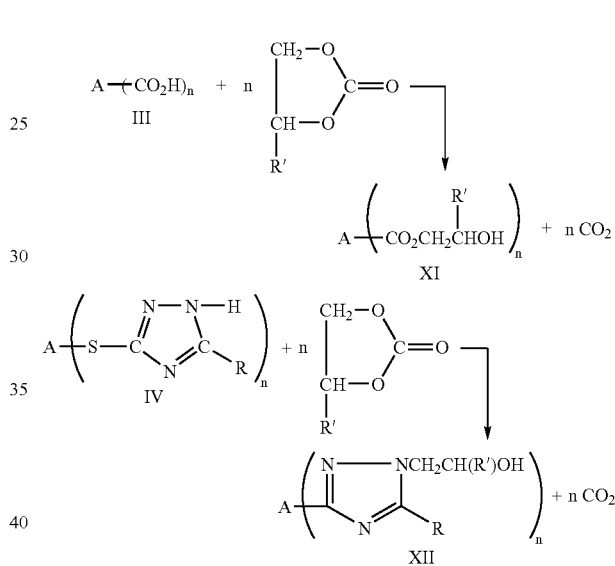

wherein R' is hydrogen or methyl, to produce hydroxyalkyl derivatives XI and XII. These reactions are facilitated by the presence of catalytic amounts of alkali halides, teraalkylammonium halides or tetraalkylammonium hydroxides. The reactions may be carried out by heating the intermediate colored diacids III and IV with at least molar equivalent amounts of alkylene carbonate. Excess alkylene carbonate also may be useful as the solvent or a co-solvent for the reaction. In particular, ethylene and propylene glycol have been found to be effective co-solvents for the preparation of XI and XII. Compounds IX and X (or XI and XII) are then acylated with one of acylating agents Ib through IXb described above to introduce the desired Q groups to prepare photopolymerizable compounds having Formulae I and II. Q groups Ia–IXa are introduced by reacting hydroxy compounds IX and X with acylating agents Ib–IXb, respectively.

Intermediate colored acidic compounds III and IV are disclosed in U.S. Pat. Nos. 3,689,501; 3,816,392; 4,359,570; 4,403,092; 4,617,373; 4,740,581; 4,745,173; 4,804,719; 4,892,922; 5,030,708; 5,102,980; 5,194,571; 5,274,072; 5,281,659; 5,372,864; 5,962,557 and WO 98/23690, wherein particularly useful diacidic intermediate colorants are disclosed.

The azo dyes above which correspond to Formula XIII and Formula XIV may be prepared by reacting azo dyes containing one to four carboxy groups or one to four 1H-1,2,4-triazol-3-ylthio groups, respectively, to incorporate the photopolymerizable groups as described above. Alternatively, the photopolymerizable groups may be incorporated into the diazotiazable amine and/or coupler portion prior to the synthesis of the azo dyes of Formula XIII and XIV.

Typical aromatic amine coupling components (HZ) which contain photopolymerizable groups and are useful in preparing colorants of Formula XIII have the following structures:

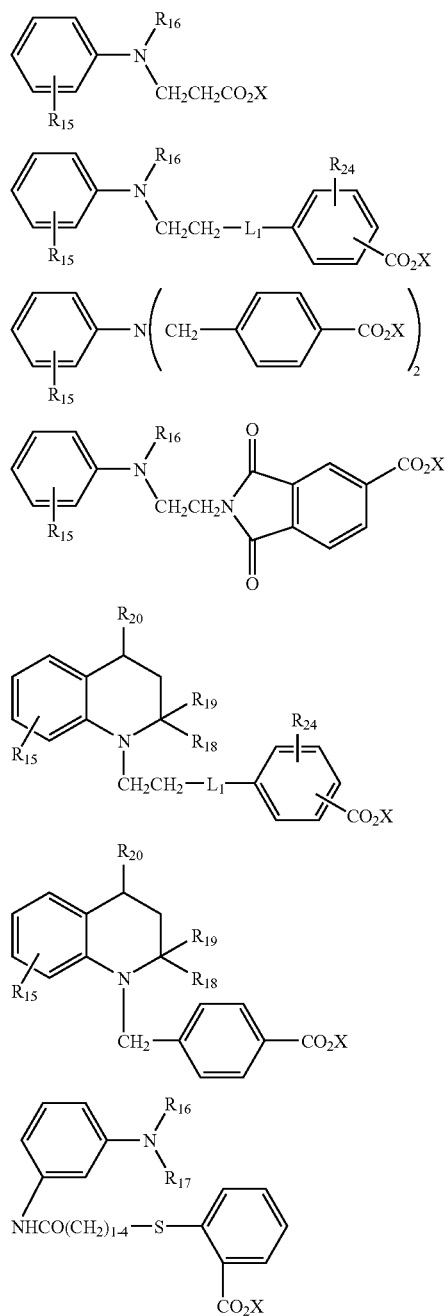

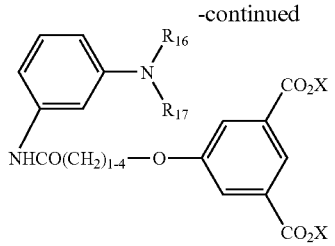

Typical aromatic amine coupling components (HZ$_1$) which contain copolymerizable groups and are useful in preparing colorants of Formula XIV have the following structures:

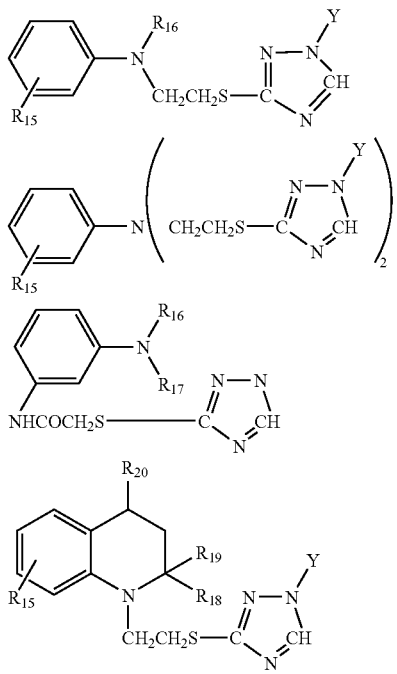

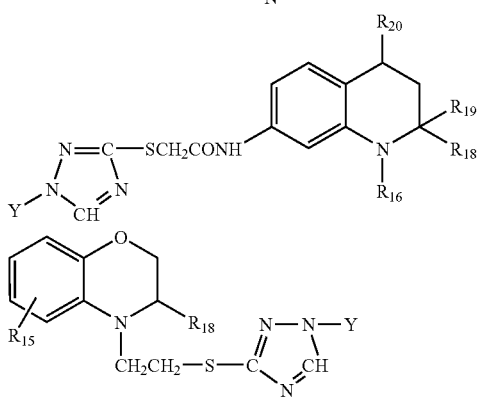

In the structures for coupling components HZ and HZ$_1$ above, $R_{15}$, $R_{16}$, $R_{18}$, $R_{19}$, $R_{20}$, $R_{24}$, X and Y have the meaning previously ascribed to them.

Colorants of Formula XV, XVII and XVIII which correspond to colorants containing the methine, 3-aryl-2,5-dioxypyrroline and 3-aryl-5-dicyanomethylene-2-oxypyrroline chromophores, respectively, may be prepared by reacting the intermediate aromatic moiety $R_{25}H$, as defined previously, which contains one or more photopolymerizable groups with either (a) Vilsmeier complex (e.g., from $POCl_3/DMF$), followed by reaction with the active methylene compound,

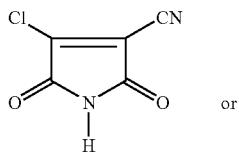
(b)

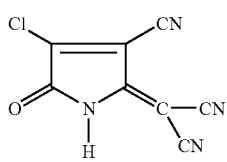
(c)

to produce colorants of Formula XV, XVII, and XVIII, respectively, wherein $R_{16}'$ is hydrogen. Compounds of Formula XVII and XVIII, wherein $R_{16}$ is hydrogen, can be further reacted to introduce photopolymerizable groups if desired.

A third alternative preparative method for azo colorants having Formula XIII and XIV involves the reaction of electron rich coupler precursors containing at least one $—CO_2H$ or 1(H)-1,2,4-triazolyl-3-ylthio group, respectively, with hydroxyalkylating agents to introduce $—CO_2—R_1—OH$ and

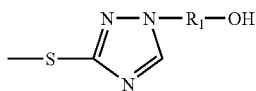

groups. These couplers then are reacted with the desired diazonium salts to produce azo dye containing the hydroxy groups which are then reacted further to introduce the photopolymerizable Q groups into the final colorant. Similarly, this method may be employed in the preparation of the colorants having Formulae XV, XVI and XVII by reacting the acidic colored intermediates containing the methine, 3-aryl-2,5-dioxypyrroline or 3-aryl-5-dicyano methylene-2-oxypyrroline chromophores, respectively, to introduce the photopolymerizable group after the chromophore is formed.

As is known to those skilled in the art, the 1(H)-1,2,4-triazolyl moiety of Formula II is a mixture of isomers having the structures:

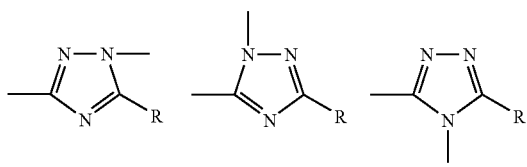

but that the isomer shown in Formula II probably predominates.

COLORANT EXAMPLES

The copolymerizable dye compounds provided by the present invention and the preparation thereof are further illustrated by the following examples.

Example 1

A mixture of 1,5-bis-(2-carboxyphenylthio) anthraquinone (U.S. Pat. No. 4,359,570, Example 1) (5.13 g, 0.01 mol), potassium carbonate (2.84 g, 0.02 mol) and N,N-dimethylformamide (DMF, 100 mL) was stirred and heated to about 100° C. To the stirred mixture, was added 4-vinylbenzyl chloride (Aldrich, 3.76 g, 0.022 m). Thin-layer chromatography (TLC) using a 50/50 mixture of tetrahydrofuran(THF)/cyclohexane after heating the reaction mixture at about 105° C. for 30 min. showed only one spot with no starting material or mono- reacted product being observed. The reaction mixture was heated for an additional 20 minutes and the yellow dye precipitated by the addition of a mixture of methanol and water. The solid dye was collected by filtration, washed with water and then with a little methanol. The yield of air-dried product was 6.85 g (92% of the theoretical yield). Field desorption mass spectrometry (FDMS) supported the following structure:

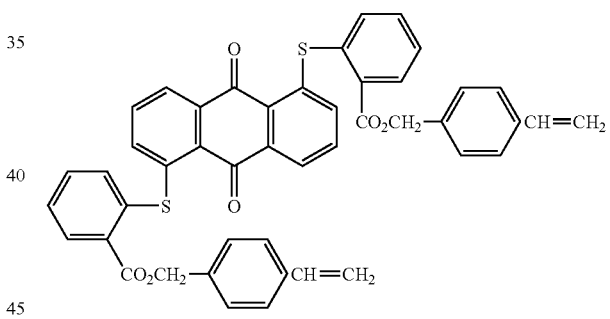

An absorption maximum at 447 nm was observed in the UV-visible absorption spectrum in DMF.

Example 2

A mixture of 1,5-bis-(2-carboxyanilino) anthraquinone (U.S. Pat. No. 4,359,570, Example 2) (4.78 g, 0.01 mol), potassium carbonate (2.76 g, 0.02 mol) and DMF (100 mL) was stirred and heated to about 90° C. and 4-vinylbenzyl chloride (Aldrich, 3.76 g, 0.022 mol) was added and heating and stirring continued at about 100° C. for 60 min. TLC (50/50 THF/cyclohexane) showed complete reaction. Methanol (120 mL) was added gradually with stirring to precipitate the red product, which was collected by filtration, washed with water and then dried in air (yield—6.18 g, 87% of the theoretical yield). FDMS supports the following structure:

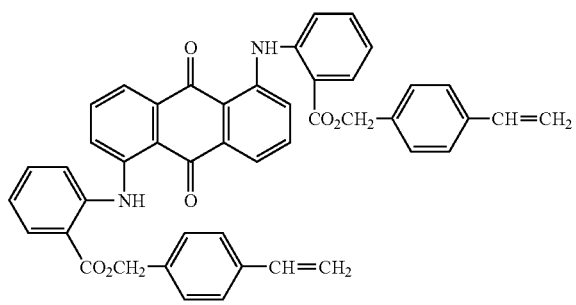

Example 3

A mixture of 1,5-bis-(isobutylamino)-4,8-bis-(2-carboxyphenylthio) anthraquinone (U.S. Pat. No. 6,197,223, Example 2) (6.54 g, 0.01 mol), potassium carbonate (2.76 g, 0.02 m) and DMF (150 mL) was stirred and heated to about 100° C. To the stirred reaction mixture was added 4-vinylbenzyl chloride (3.76 g, 0.02 mol). The reaction mixture was heated at 95–100° C. for about 60 minutes The reaction mixture was cooled and the gummy product was drowned out by the addition of methanol/water. The liquid was decanted off and the product triturated with methanol. The resulting dark blue solid Was collected by filtration, washed with methanol and dried in air (yield—6.95 g, 78% of the theoretical yield). FDMS supported the following structure:

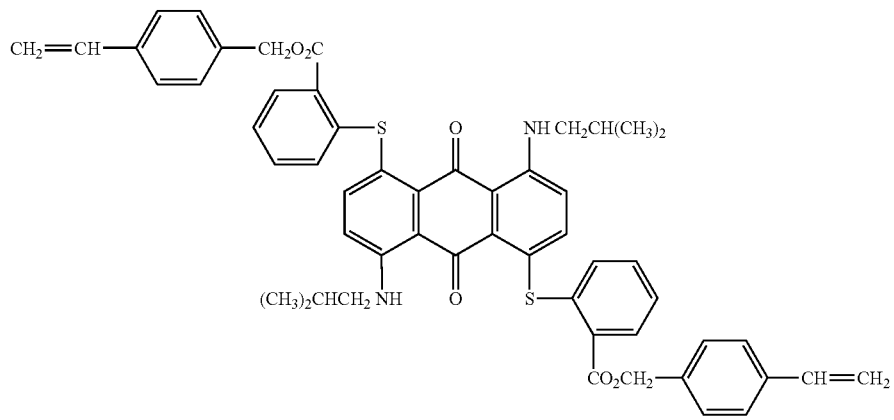

Absorption maxima at 600 nm and 645 nm were observed in the UV-visible absorption spectra in DMF.

Example 4

A mixture of 1,5-bis-(2-carboxyphenylthio)-4,8-bis-(4-tolylthio)-anthraquinone (U.S. Pat. No. 6,197,223) (7.56 g, 0.01 mol), potassium carbonate ($K_2CO_3$) and DMF (300 mL) was stirred and heated to about 100° C. and then 4-vinylbenzyl chloride (3.84 g, 0.025 mol) was added. The reaction mixture was heated and stirred at about 100° C. for 60 minutes. TLC (50/50 THF/cyclohexanol) showed complete reaction. After cooling, the sticky product was obtained by drowning the reaction mixture with methanol/water. The red product solidified upon standing in contact with methanol and was collected by filtration and dried in air (yield—7.67 g, 78% of the theoretical yield). FDMS supported the following structure:

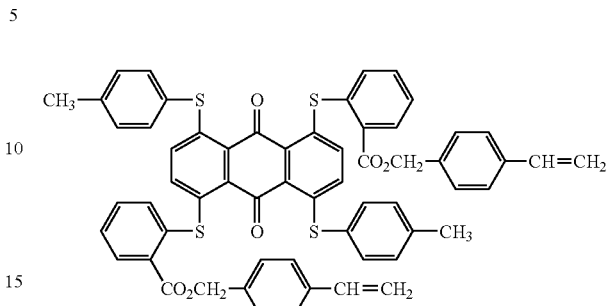

An absorption maximum was observed at 520 nm in the UV-visible absorption in DMF.

Example 5

A mixture of 1,5-bis-[(1H)-1,2,4-triazol-3ylthio)]anthraquinone (U.S. Pat. No. 3,689,501) (4.06 g, 0.01 mol), potassium carbonate (2.76 g, 0.02 mol) and DMF (100 mL) was stirred and heated to about 100° C. and 4-vinylbenzyl chloride (3.76 g, 0.022 mol) was added. TLC (50/50 THF/cyclohexane) still showed some mono-substituted product after heating the reaction mixture for 2 hrs. Additional quantities of 4-vinylbenzyl chloride (4.14 g) and potassium chloride (1.38 g) were added and heating continued for another hour to complete the reaction. A gummy yellow solid was produced by drowning the cooled reaction mixture with water. The product was washed by decantation with water and then dissolved in DMF. The DMF solution was drowned gradually into cold water with good stirring and the yellow solid was collected by filtration and dried in air (3.46 g, 54% of the theoretical yield). FDMS supported the following structure:

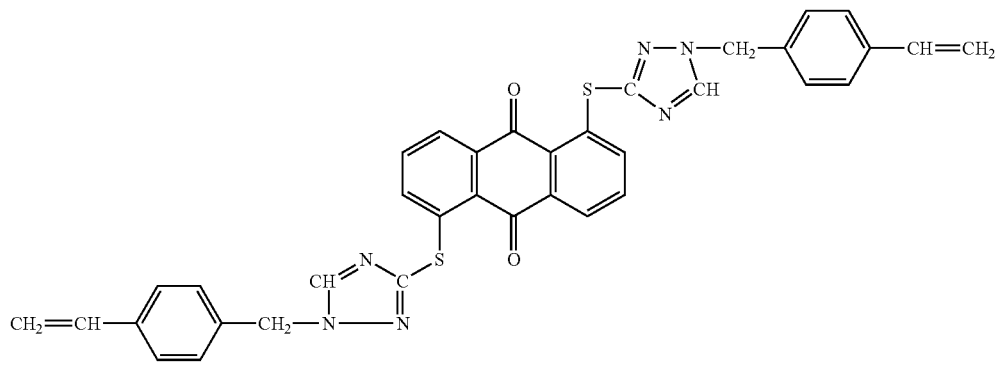

An absorption maximum at 420 nm was observed in the UV-visible absorption spectrum in DMF.

Example 6a

A mixture of 1,5-bis-(2-carboxyphenylthio) anthraquinone (U.S. Pat. No. 4,359,570, Example 1) (30.6 g, 0.06 mol), ethylene carbonate (88.0 g, 1.0 mol), ethylene glycol (50 mL) and pulverized potassium iodide (5.2 g) was heated and stirred at about 125° C. for about 2.0 hours and then allowed to cool. The reaction mixture was drowned into cold water (150 mL) with stirring. The yellow solid was collected by filtration, washed with warm water and dried in air (yield—35.2 g, 97.8% of the theoretical yield). FDMS supported the following structure:

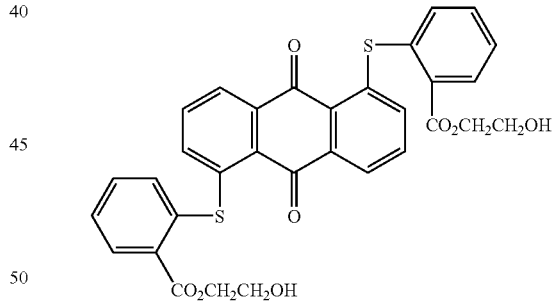

Example 6b

A mixture of the product of Example 6a (6.0 g, 0.01 mol), DMF (25 mL) and 3-isopropenyl-α,α-methylbenzyl isocyanate (6 mL, 0.03 mol) was heated and stirred, under nitrogen at about 95–100° C. for about 48 hours. Triethylamine (0.5 mL) was added and heating continued for an additional 48 hours. Water (60 mL) was added portionwise to the hot reaction mixture with stirring. After allowing to cool to room temperature, the yellow product was collected to filtration, washed with water and dried in air. Essentially a quantitative yield of the following product was obtained:

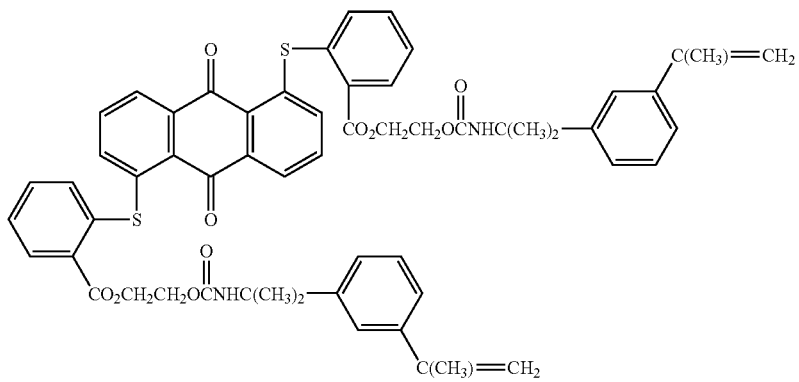

Example 7

The dye of Example 6a above (2.0 g, 3.33 mmol) and toluene (20 mL) were mixed and stirred while most of the toluene was removed under reduced pressure. DMF (50 mL), 4-(dimethylamino)pyridine (DMAP, 82 mg), triethylamine (1.4 mL), hydroquinone (50 mg) and methacrylic anhydride (1.53 g, 9.99 mmol) were added and the reaction mixture stirred at room temperature for 15 hours. The yellow functionalized dye which was precipitated by drowning into water (200 mL) and allowing to stand for several days was collected by filtration, washed with water and 1:1 methanol:water and dried in vacuo. The yield was 2.23 g (91% of the theoretical yield). FDMS supported the following structure:

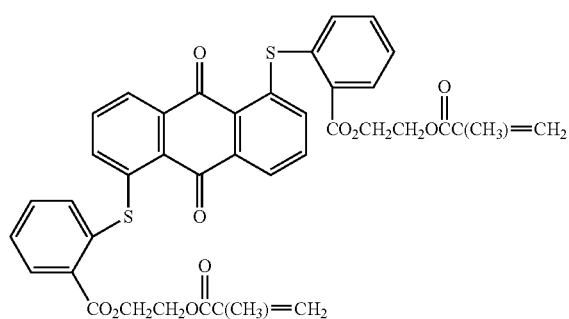

An absorption maximum at 444 nm was observed in the UV-visible absorption spectrum in DMF.

Example 8a

A mixture of 1,5-bis-(carboxyanilino) anthraquinone (U.S. Pat. No. 4,359,570, Example 2) (59.75 g, 0.125 mol), ethylene carbonate (165 g, 1.875 mol), ethylene glycol (550 mL) and pulverized potassium iodide (11.3 g) was heated at 120–125° C. for 6.5 hours and the mixture allowed to cool. Methanol (400 mL) was added to the stirred reaction mixture. The red solid was collected by filtration, washed with water and dried in air (yield—69.5 g, 98.2% of the theoretical yield). FDMS supported the following structure:

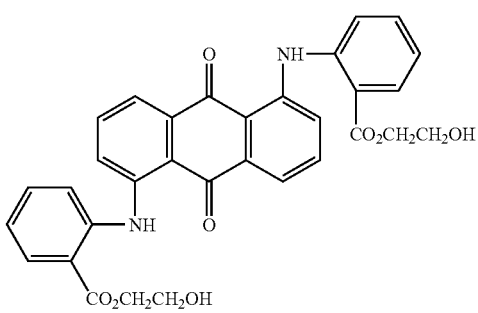

Example 8b

A portion (2.0 g, 3.53 mmol) of the dye of Example 8a above was mixed with toluene (10 mL) and most of the toluene removed under vacuum. DMF (50 mL), DMAP (86 mg), triethylamine (1.5 mL), hydroquinone (20 mg) and methacrylic anhydride (1.63 g, 10.6 mmol) were added and the resulting solution was stirred for 15 hours at room temperature. The reaction mixture was drowned into water (200) and allowed to stand at room temperature for several days. The functionalized red dye was collected by filtration, washed with water and dried in vacuo (yield—2.10 g, 85% of the theoretical yield). FDMS supported the following structure:

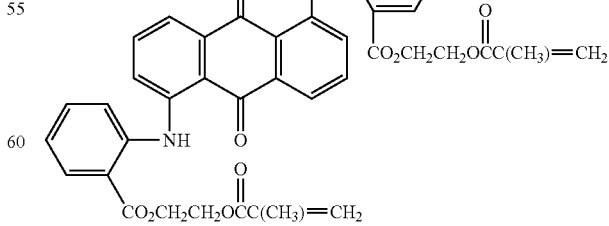

An absorption maximum at 525 nm was observed in DMF solution in the UV-visible absorption spectrum.

Example 9

A portion (2.0 g, 3.53 mmol) of the dye from Example 8a above was mixed with toluene and stirred while most of the toluene was removed under reduced pressure. DMF (50 mL), DMAP (86 mg), triethylamine (1.5 mL), hydroquinone (20 mg) and crotonic anhydride (1.63 g, 10.6 mmol) were added and the reaction mixture was stirred for 24 hours. The functionalized red dye was isolated by drowning into water (200 mL), allowing the mixture to stand for a little while and then collecting by filtration. After washing with water the dye was dried in vacuo (yield—2.11 g, 85% of the theoretical yield). FDMS supported the following structure:

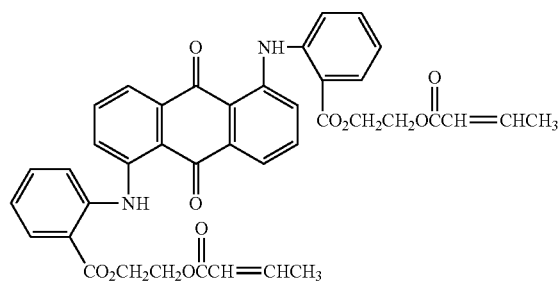

An absorption maximum at 522 nm in DMF solution was observed in the UV-visible light absorption spectrum.

Example 10

A mixture of a portion (2.0 g, 3.33 mmol) of the dye of Example 6a above and toluene (10 mL) was stirred and most of the toluene removed under vacuum. DMF (50 mL), DMAP (86 mg) triethylamine (1.4 mL), hydroquinone (20 mg) and crotonic anhydride (7.54 g, 9.99 mmol) were added. The reaction mixture was stirred at room temperature for 24 hours and drowned into water (200 mL) with stirring. The mixture was allowed to stand awhile and the functionalized yellow dye was collected by filtration, washed with water and dried in vacuo (yield 2.01 g, 82% of the theoretical yield). FDMS supported the following structure:

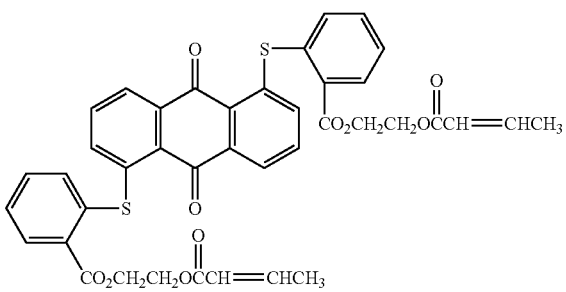

An absorption maximum at 446 nm was observed in DMF in the UV-visible light absorption spectrum.

Example 11a

A mixture of 1-chloroanthraquinone (97.2 g, 0.40 mol); thiosalicylic acid (61.6 g, 0.40 mol), potassium acetate (80 g, 0.80. mol), cuprous chloride (0.5 g) and 2-ethoxyethanol (500 ml) was stirred and heated at reflux (130–135° C.) for 6.5 hours. After allowing to cool, the reaction product was collected by filtration and washing with methanol. The still moist cake was slurried in water (750 ml) and the mixture acidified by the addition of concentrated hydrochloric acid (75 ml). The mixture was stirred at ambient temperature for thirty minutes and the yellow product was collected by filtration, washed with water, washed with a little methanol and dried in air (yield—110.6 g, 76.87% of the theoretical yield). Field desorption mass spectrometry (FDMS) supported the following structure:

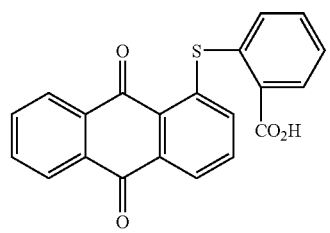

Example 11b

A mixture of 1-(2-carboxyphenylthio) arthraquinone (Example 11a) (3.60 g, 0.01 mol), potassium carbonate (1.38 g, 0.01 mol) and N,N-dimethylformamide (DMF), (70 ml) was heated and stirred. At 70° C., 4-vinylbenzyl chloride (1.87 g, 0.011 mol) was added and the reaction mixture was heated to about 100° C. After being heated at about 100° C. for forty minutes, the reaction mixture was allowed to cool and then was drowned with stirring into water (200 ml). After standing overnight at room temperature the yellow solid was collected by filtration, washed with water and dried in air. The yield of product was 4.40 g, 92% of the theoretical yield. FDMS analysis supported the following structure:

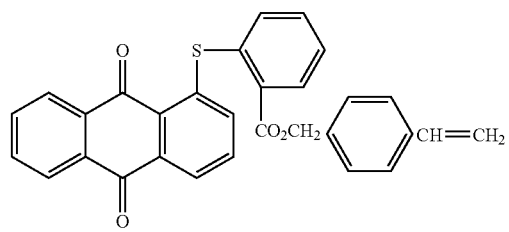

An absorption maximum at 425 nm was observed in the UV-visible light absorption spectrum in DMF.

Example 12a

A mixture of thiosalicylic acid (4.63 g, 0.03 mol), potassium carbonate (8.70 g, 0.06 mol) and DMF (75 ml) was heated and stirred at 100° C. for two hours. This mixture was allowed to cool to room temperature and added to a stirred mixture of 1,5-dichloro-4,8-dinitroanthraquinone (5.51 g, 0.015 mol) and DMF (150 ml) which had been cooled to about 0° C. A slight exotherm of 2–3° C. was observed. The mixture was stirred at about 0–5° C. for thirty minutes and then allowed to stand overnight at room temperature. A second mixture of thiosalicylic acid (4.63 g, 0.03 mol), potassium carbonate (8.73 g, 0.06 mol) and DMF (40 ml), which had been stirred for 1.5 hours at room temperature, was added to the previously described mixture. After being heated and stirred at about 100° C. for five hours, the reaction mixture was cooled to room temperature and drowned into water (600 ml) with stirring. After the mixture was acidified by the addition of glacial acetic acid, the dark red product was collected by filtration, washed with water and air dried. (yield—10.70 g, 87.3% of the theorectical yield). FDMS supported the following structure:

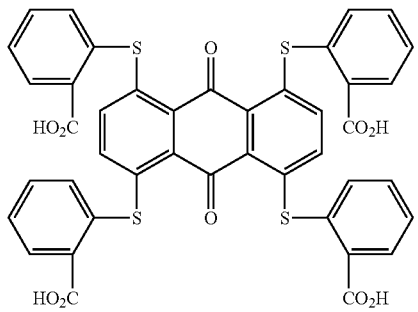

Example 12b

A mixture of 1,4,5,8-tetra(2-carboxyphenylthio) anthraquinone (1.22 g, 1.5 mmol) (Example 12a), potassium carbonate (0.83 g, 6.0 mmol) and DMF (20 ml) was stirred and 4-vinylbenzyl chloride (1.01 g, 6.6 mmol) was added. The reaction mixture was heated at about 100° C. for thirty minutes. After cooling to room temperature, the mixture was drowned into methanol. The dark red solid was collected by filtration, washed with methanol and dried in air. The yield of product was 1.58 g, 82% of the theoretical yield. FDMS supported the following structure:

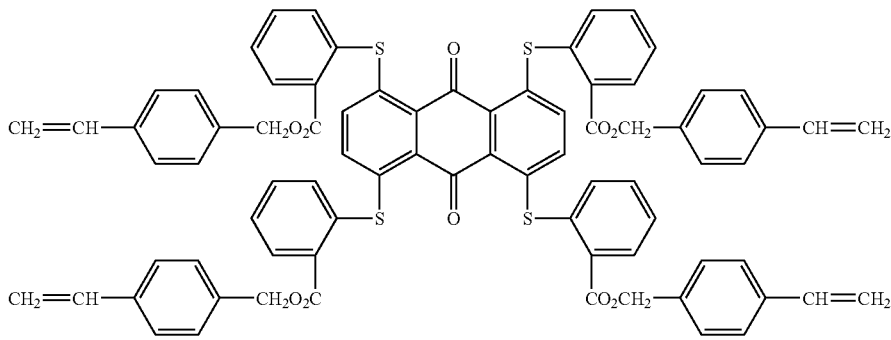

An absorption maximum at 543 nm was observed in the UV-visible light absorption spectrum in DMF solvent.

Example 13a

A mixture of brominated diaminoanthrarufin (3.49 g, 0.01 mol), thiosalicylic acid (3.08 g, 0.02 mol), potassium carbonate (5.53 g, 0.04 mol), cuprous chloride (0.30 g) and DMF (50 ml) was heated at 95–100° C. for about six hours. The reaction mixture was cooled and then drowned into acetone (400 ml). The solid potassium salt of the product was collected by filtration and then redissolved in hot water (300 ml). The free acid was obtained by acidification with glacial acetic acid, collecting by filtration, washing with water and drying in air (yield 3.40 g). FDMS showed the product to be a mixture of mono-and bis-(2-carboxyphenylthio) substituted diaminoanthrarufin having the following structure:

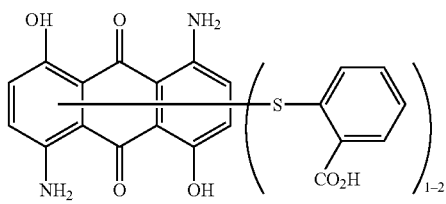

Example 13b

A mixture of a portion of the product from Example 13a (0.85 g), potassium carbonate (0.34 g) and DMF (20 ml) was stirred and heated to about 100° C. and 4-vinylbenzyl chloride (0.38 g) was added. The reaction mixture was stirred at about 100° C. for about thirty minutes, cooled to room temperature and then drowned into methanol (200 ml). The dark blue product was collected by filtration, washed with methanol, water and then again with methanol to promote drying. The air-dried product weighed (0.69 g). FDMS showed the product to have the following structure:

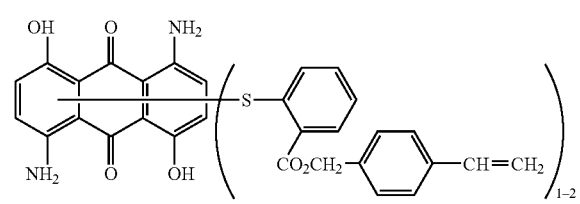

wherein the monosubstitued product was the major predominate structure present. An absorption maximum at 641 nm was observed in the UV-visible light absorption spectrum.

Example 14a

A mixture of 1,8-diamino-2,7-dibromo-4,5-dihydroxyanthraquinone (2.14 g, 0.005 mol), thiosalicylic acid (1.69 g, 0.011 mol), potassium carbonate (3.0 g), cuprous chloride (0.30 g) and DMF (45.0 ml) was heated at steam bath temperature for about 6.0 hours. The reaction mixture was cooled and drowned into acetone (500 ml). The resulting solid was collected by filtration and the acetone-wet material was dissolved in warm water. Acetic acid was added to precipitate the diacid product which was collected by filtration, washed with water and dried in air (yield—2.60 g).

Example 14b

A mixture of 1,8-diamino-4,5-dihydroxy-2,7-bis(carboxyphenylthio) anthraquinone (1.15 g, 2.0 mmol), (from Example 14a) potassium carbonate (0.56 g, 4.0 mmol) and DMF (20 ml) was heated to about 100° C. and 4-vinylbenzyl chloride (0.68 g, 4.4 ml) was added. Stirring and heating were continued at about 100° C. for four hours. The product was isolated by drowning into water and collecting the product by filtration. The product comprises primarily the compound having the following expected structure:

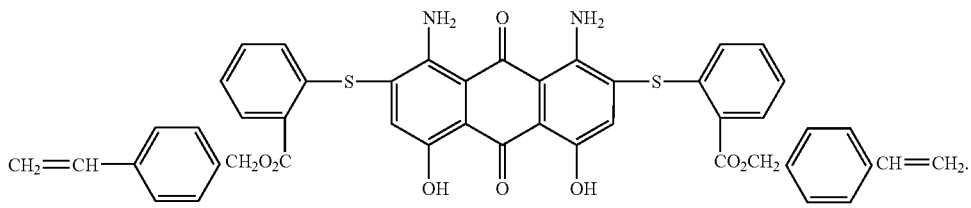

When the product was dissolved in DMF a bright cyan color was obtained.

Example 15

A mixture of 1-cyano-6(3',5'-dicarboxyphenylamino)-3-methyl-3H-dibenz[f,lj]isoquinoline-2,7-dione (Example 119a of U.S. Pat. No. 6,197,223) (4.65 g, 0.01 mol), potassium carbonate (0.02 mol) and DMF (100 ml) was stirred and heated in about 90° C. and 4-vinylbenzyl chloride (3.73 g 0.022 mol) was added. After being heated at about 110° C. for 3.0 hours, thin-layer chromatography (90/10 THF/cyclohexane) showed the reaction to be complete and the reaction mixture was cooled to room temperature. Methanol (100 ml) was added with stirring to the reaction mixture. After being allowed to stand overnight at room temperature, the product was collected by filtration, washed with methanol and dried in air (yield—3.80 g, 54% of the theoretical yield) and has the structure:

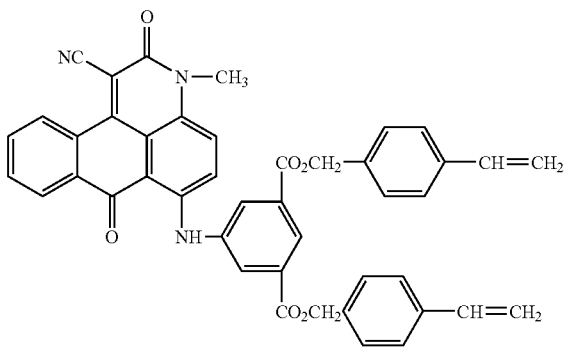

A bright violet color was obtained when the product was dissolved in DMF.

Example 16a

A mixture of 6-bromo-1-cyano-3H-dibenz[f,ij]isoquinoline-2,7-dione (3.65 g, 0.01 mol) thiosalicylic acid (1.54 g, 0.01 mol), potassium carbonate (2.76 g, 0.02 mol) and DMF (60 ml) was stirred and heated at about 95–100° C. for 1.5 hours. After allowing to cool, the reaction mixture was drowned into water (100 ml) and the mixture acidified by the addition of glacial acetic acid. The red solid was collected by filtration, washed with water and dried in air. The yield of product was 4.38 g (100% of the theoretical yield). FDMS supported the following expected structure:

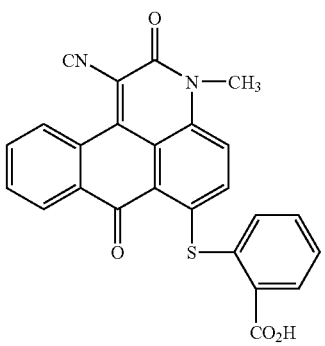

Example 16b

The carboxy anthrapyridone dye of Example 16a (4.38 g, 0.01 mol), potassium carbonate (1.38 g, 0.01 mol) and DMF (100 ml) were stirred together and heated to about 100° C. for 30 minutes. After cooling, water (100 ml) was added dropwise to the stirred reaction mixture. The precipitated red product was collected by filtration, washed with water and dried in air (yield—4.92 g, 89% of the theoretical yield). FDMS supported the following structure:

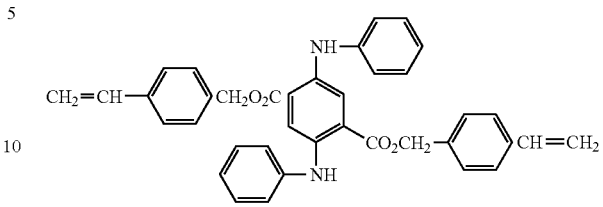

An absorption maximum was observed at 471 nm in the UV-visible light absorption spectrum in DMF as solvent.

Example 18a

A mixture of 1,5-bis-[(1H)-1,2,4-triazolythio]anthraquinone (8.12 g, 0.02 mol), ethylene carbonate (29.4 g, 0.33 mol), ethylene glycol (30 ml) and pulverized potassium iodide (2.0 9) was heated and stirred at 125° C. for 3.5 hours. The reaction mixture was allowed to cool and water (100 ml) was added dropwise with stirring. The yellow product (1,5-bis-[[1(2-hydroxyethyl)-1,2,4-triazolyl-3-yl]thio]anthraquinone) was collected by filtration, washed with water and dried in air (yield 0 6.8 g, 69% of the theoretical yield).

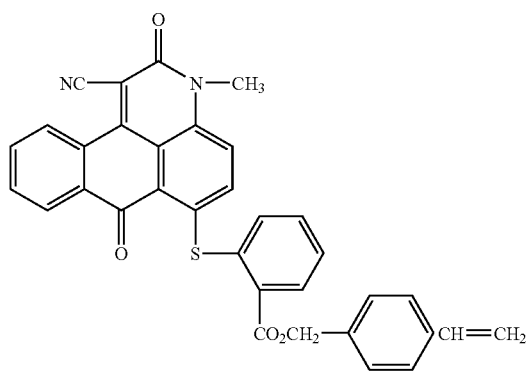

An absorption maximum was observed at 523 nm in the UV-visible light absorption spectrum in DMF as solvent.

Example 17

A mixture of 2,5-dianilinoterephthalic acid (3.48 g, 0.01 mol), potassium carbonate (2.76 g) and DMF (100 ml) was stirred and heated to 100° C. and 4-vinylbenzyl chloride (3.76 g, 0.11 mol) was added. Heating was continued for 1.0 hour and then the cooled reacting mixture was treated with 200 ml of water which was added dropwise. The orange product was collected by filtration, washed with water and dried in air (yield—5.58 g, 96% of the theoretical yield). FDMS supported the following expected structure:

Example 18b

A mixture of a portion (1.0 g, 0.0020 mol) of the product from Example 18a, DMF (25 ml), hydroquinone (10 mg), 4-(dimethylamino)-pyridine (49 mg) and methacrylic anhydride (0.91 ml) was stirred at room temperature and triethylamine (0.85 ml) was added dropwise. The reaction mixture was stirred at room temperature for 24 hours and then drowned into water. The yellow product was collected by filtration, washed with water and dried in air (yield—0.85 g, 67% of the theoretical yield). FDMS supported the following expected structure:

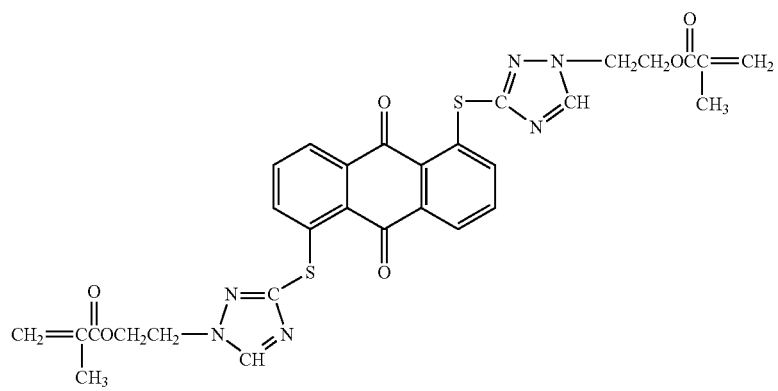

An absorption maximum at 422 nm was observed UV-visible spectrum in DMF as solvent.

Example 19a

A mixture of 1,5-bis-(cyclohexylamino)4,8-bis-(2'-carboxyphenylthio) anthraquinone (49.5 g, 0.07 mol), ethylene carbonate (149 g, 1.69 mol), pulverized potassium iodide (42 g) and ethylene glycol (300 ml) was heated and stirred to 100° C. and held at about 110° C. for about 1.0 hour (some foaming resulted). Heating and stirring were continued at 125° C. for about 2.5 hours and the cooled reaction mixture was then drowned into 2500 ml of methanol. Some water was added to the methanol solution so further precipitate the blue solid, which was collected by filtration, washed with water and dried in air (yield—36.3 g, 62% of the theoretical yield). FDMS showed that the structure was that of the starting material for Example 19b.

Example 19b

A mixture of a portion of the 1,5-bis(cyclohexylamino)-4,8-bis-[2'-hydroxyethoxycarbonyl)-phenylthio]anthraquinone from Example 19a (1.0 g, 0.00126 mol), DMF (25 ml), hydroquinone (10 mg), DMAP (30.8 mg) and methacrylic anhydride (0.563 ml) was stirred and triethylamine (0.527 ml) was added dropwise. The reaction mixture was stirred for 24 hours at room temperature and then drowned into water (50 ml). The blue product was collected by filtration, washed with water and dried in air (yield—0.65 g, 56% of the theoretical yield). FDMS supported the following expected structure:

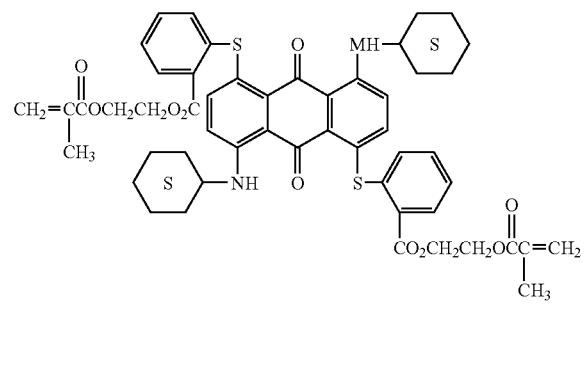

Absorption maxima at 603 nm and 646 nm were observed in the UV-visible absorption spectrum in DMF solution.

Example 20a

Preparation of Azo Dye Coupler

A mixture of 3-acetamido-N,N-bis-(4-carboxybenzyl) aniline (12.5, 0.03 mol) (prepared as described in Example 91b of U.S. Pat. No. 6,197,223), ethylene carbonate 44 g, 0.50 mol), ethylene glycol (60 ml) and pulverized potassium iodide (2.68 g) was stirred and heated at 120–125° C. for 4.0 hours. Water (150 ml) was added drop wise with stirring to the cooled reaction mixture. The resulting solid was collected by filtration, washed with water and dried in air (yield—12.9 g, 85% of the theoretical yield). FDMS supported the following structure:

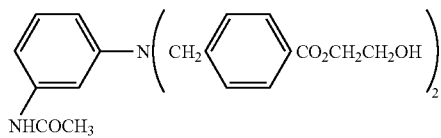

Example 20b

Preparation of Intermediate Azo Dye

A mixture of 5-amino-4-cyano-3-methylisothiazole (1.39 g, 0.01 mol) and water (17.5 ml) was stirred and cooled in an ice bath. Concentrated sulfuric acid (8.3 ml) was added portionwise below about 40° C. Nitrosyl sulfuric acid (40%) (3.2 g, 0.01 mol) was then added with stirring below about 3° C. The orange solution was stirred at −2° C. to +2° C. for 2.0 hours and then added to a chilled solution of a portion (5.0 g, 0.01 mol) of the coupler from Example 20a dissolved in water (100 ml) containing concentrated sulfuric acid (10 ml) and 1:5 acid (1 part propionic acid:5 parts acetic acid by weight) (50 ml). The coupling mixture was kept cold and the mineral acid neutralized by the addition of ammonium acetate with stirring. After being allowed to stand for about 1.0 hour with occasional stirring, the coupling mixture was drowned by the addition of water. The solid dye was collected by filtration, washed with water and dried in air. After being reslurried in hot methanol and allowing to cool, the dye was collected by filtration, washed with methanol, and dried in air (yield—3.9 g, 59% of the theoretical yield). FDMS supported the following structure:

$$\text{CH}_3\text{-isothiazole-N=N-phenyl(NHCOCH}_3\text{)-N(CH}_2\text{-phenyl-CO}_2\text{CH}_2\text{CH}_2\text{OH)}_2$$

An absorption maximum was observed at 543 nm in the UV-Visible light absorption spectrum in DMF solution.

Example 20c

A portion of the azo dye from Example 20b (0.50 g), DMF (25 ml), hydroquinone (5 mg) DMAP (19 mg).and methacrylic anhydride (0.34 ml) were mixed and stirred and triethylamine (0.32 ml) was added drop wise. After being stirred at room temperature for 24 hours, the reaction mixture was drowned into water, collected by filtration, washed with water and dried in air (yield—0.5 g). FDMS supported the following expected structure:

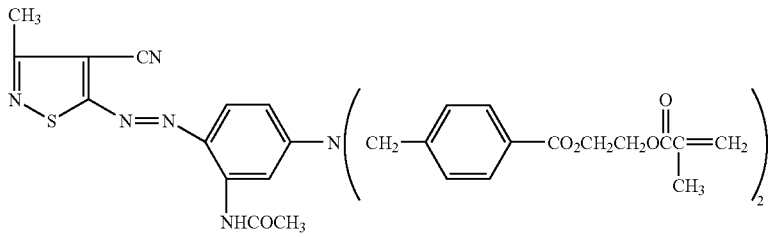

An absorption maximum was observed at 543 nm in the UV-visible absorption spectrum in DMF solution.

Example 21a

To p-dioxane (600 ml) was added N-(α-cyanoacetyl) piperidine (30.4 g, 0.20 mol) and the solution was stirred and cooled to about 5° C., at which temperature phosphorous oxychloride (30.6 g, 0.2 mol) was added dropwise while keeping the temperature below 5° C. While stirring the reaction mixture at about 30° C., 1-amino4-bromoanthraquinone (58.6 g, 0.194 mol) was added portion-wise. The reaction mixture was then heated at about 95° C. for 12 hours and then drowned into ice/water mixture. A 20% aqueous solution of sodium carbonate was added gradually until a pH of about 9 was obtained. The red product was collected by filtration washed with water are dried in air (66.3 g, 82% of the theoretical yield).

Example 21b

A portion (20.0 g, 0.050 mol) of the 6-bromo-1-cyano-2-piperidino-7H-dibenz[f,ij]-isoquinoline-7-one which was prepared in Example 21a, ethylene glycol (500 ml), dimethyl 5-aminoisophthalate (20.0 g, 0.1 mol), potassium acetate (10.0 g) and cupric acetate (10.0 g) were mixed and stirred and heated gradually to about 180° C. and held for 1.5 hours, whereupon the reaction mixture was cooled and drowned into water (800 ml). The product was collected by filtration, washed with water and dried in air (yield—46.0 g). FDMS indicated that the product consisted largely of the following structure:

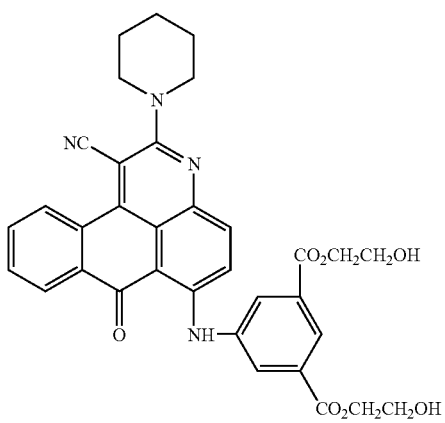

Example 21c

A mixture of a portion (2.0 g, 0.0033 mol) of the product of Example 21b, DMF (25 ml), hydroquinone (20 mg), DMAP (80.6 mg) and methacrylic anhydride (1.47 ml) were mixed and stirred while triethylamine (1.4 ml) was added drop-wise. Stirring was continued at room temperature for 24 hours. The reaction mixture then was poured into methanol (50 ml) and then water (100 ml) was added to precipitate the product, which was collected by filtration, washed with water and dried in air (yield—2.2 g, 90% of the theoretical yield). FDMS indicated that the product consisted primarily of the compound having the expected structure:

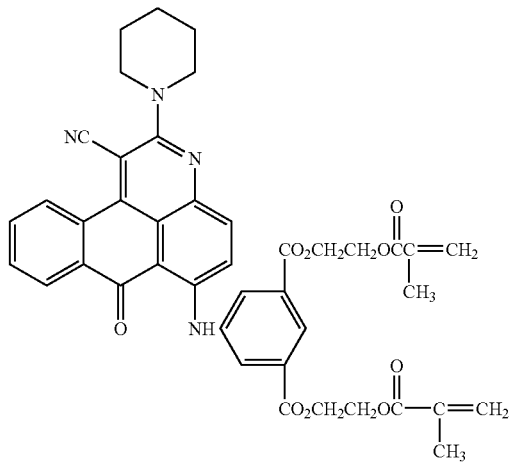

The product had a magenta color when dissolved in DMF.

Example 22a

To 40% nitrosylsulfuric acid (9.6 9, 0.03 mol-100% basis) was added 1:5 acid (15 ml) with stirring at below 25° C. While cooling further, 2-chloro-4-nitroaniline (5.18 g, 0.03 mol) was added portion wise below about 8° C. Stirring was continued at about 3–8° C. for 2 hours. The diazotization reaction mixture was filtered through a fritted glass funnel to remove a few coarse particles of undissolved 2-chloro4-nitroaniline. The diazonium salt solution was added to a chilled solution of 3-acetamido-N,N-bis-(4-carboxy-benzyl) aniline (12.6 g, 0.03 mol) dissolved in 1:5 acid (120 ml) at below about 10° C. with stirring. The coupling mixture was neutralized by the portion-wise addition of ammonium acetate until neutral to Congo Red test paper and then stirred for about 1.0 hour at below 15° C. Cold water (500 ml) was added to the mixture. The solid red product was collected by filtration, washed with water and dried in air. After reslurrying in hot methanol, cooling, collecting by filtration, washing with methanol and drying in air 10.1 g (56% of the theoretical yield) of the product was obtained which had the following structure:

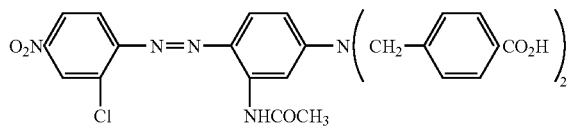

Example 22b

A mixture of a portion (0.60 g, 0.001 mol) of the bis-carboxy azo compound from Example 22a, potassium carbonate (0.28 g), DMF (20 ml) and 4-vinylbenzyl chloride (0.35 mol, 0.0022 mol) was stirred at about 100° C. for 2.5 hours. After cooling the reaction mixture was diluted with methanol to precipitate the product which was collected by filtration, washed with methanol and then slurried in water to remove any salts. After being collected by filtration, washed with water and dried in air, 0.35 g (42% of the theoretical yield) of product was obtained. FDMS supported mostly the following structure:

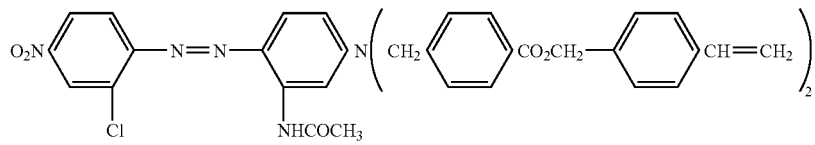

Example 23a

Thiosalicylic acid (46.3 g, 0.30 mol) was mixed with DMF (400 ml) and stirred. Potassium carbonate (82.8 g, 0.60 mol) was added and the reaction mixture was gradually heated to about 95–100° C., held for 1.5 hours. After being allowed to cool, the mixture was added portion wise to a stirred mixture of 1,5-dichloro4,8-dinitroanthraquinone (54.9 g, 0.150 mol) and DMF (1.0 L). The reaction mixture was stirred at about 15 minutes at 10–15° C. Cooling was removed and stirring was continued at ambient temperature for 3 hours. A solution of 4-thiocresol (37.3 g, 0.3 mol) in DMF (250 ml) was added and then the whole reaction mixture was heated at about 95° C. for about 8 hours. After allowing to cool, the reaction mixture was drowned into a mixture of concentrated HCl (100 ml) water (1900 ml) and some crushed ice. The product was collected by filtration washed with water and dried in air (yield 109.8 g).

Example 23b

A mixture of 1,5-bis(2-carboxyphenylthio)-4,8-bis-(4-tolythio)-anthraquinone produced as described in Example 23a (3.78 g, 0.005 mol), ethylene carbonate (5.28 g, 0.06 mol), ethylene glycol (25 ml) and pulverized potassium iodide (1.5 g) was heated and stirred at about 125° C. for 4.0 hours. After being allowed to cool, the product was precipitated by the addition of methanol. The solid was collected by filtration, washed with methanol, and dried in air (yield—2.94 g, 70% of the theoretical yield). FDMS showed that the product consisted primarily of a compound having the structure:

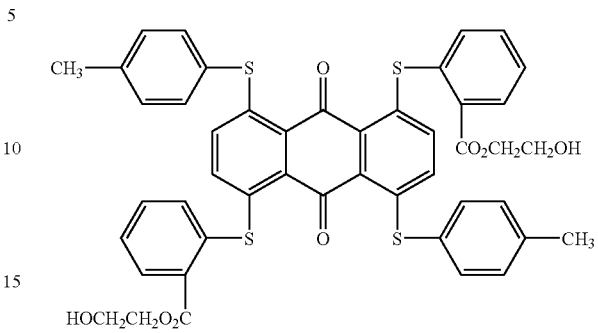

Example 23c

A portion (0.5 g, 0.00059 mol) of the product from Example 23b, DMF (10 ml), DMAP (14.4 mg), hydroquinone (5 mg) and methacrylic anhydride (0.265 ml) were mixed and stirred at room temperature while triethylamine (0.248 ml) was added dropwise. Stirring was continued at room temperature for 24 hours. Methanol (50 ml) was added to the reaction mixture and then the product was precipitated by the addition of water (75 ml). The solid was collected by filtration, washed with water, and dried in air (yield—0.47 g, 81% of the theoretical yield). FDMS supported the following structure:

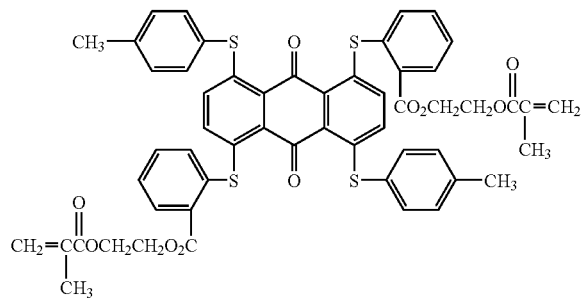

The product produced a bright red color when dissolved in DMF.

Example 24a

A mixture of 2,5-dianilinoterephthalic acid (20.90 g, 0.06 ml), ethylene carbonate (63.40 g, 0.72 mol), ethylene glycol (65 ml) and pulverized potassium iodide (17.5 g) was stirred and heated under nitrogen to about 120° C. Considerable foaming occurred at about 120° C. but soon subsided and the temperature was increased to about 125° C. and stirring continued for 3.5 hours. The reaction mixture was cooled and methanol (100 ml) was added to the reaction mixture dropwise. The orange solid which crystallized was collected by filtration, washed with water and dried in water (yield— 14.4 g, 55% of the theoretical yield). FDMS showed that the product was the bis-(2-hydroxyethyl) ester having the formula:

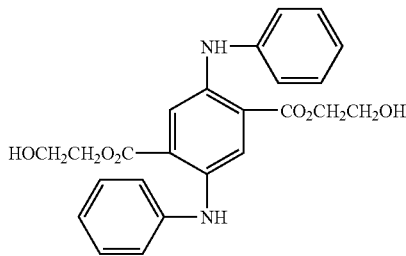

Example 24b

The orange diol colorant as prepared in Example 24a (50.0 g, 0.115 mol), acetone (150 ml), DMAP (2 g), t-butylhydroquinone (1 g) and triethylamine (50 g) were mixed together and the mixture was stirred and heated to 40° C. and methacrylic anhydride (50 g) was added dropwise. A slight exotherm was observed and heating was continued for 1.0 hours. The reaction solution was allowed to cool and water (150 ml) was added drop wise over about 30 minutes to precipitate the product which was collected by filtration, washed with water and dried at about 60–70° C. under vacuum. The yield of bright orange solid was 45.0 g, 66% of the theoretical yield. FDMS supported the following structure:

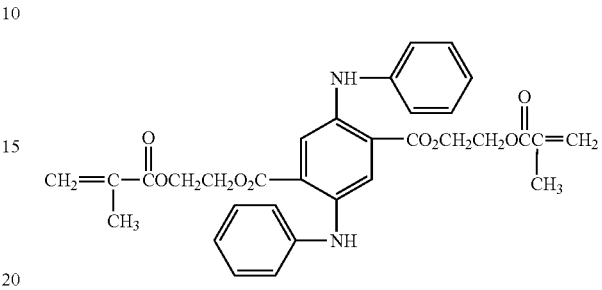

Additional examples of the colorant compounds which contain one or more ethylenically-unsaturated (vinyl), photopolymerizable radicals according to the present invention are set forth in the examples of Tables I–XIV. These compounds may be prepared by procedures analogous to those described in the preceding examples and/or by published techniques.

TABLE I

Azo Colorants of Formula XIII

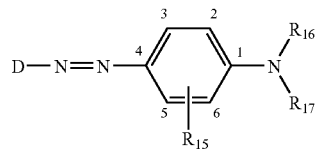

| Example No. | D | $R_{15}$ | $R_{16}$ | $R_{17}$ |
|---|---|---|---|---|
| 25 | 4-$NO_2$-phenyl | H | —$CH_2$—$C_6H_4$-4-$CO_2$—$CH_2CH_2$—OCOC($CH_3$)=$CH_2$ | —$CH_2$—$C_6H_4$-4-$CO_2$—$CH_2CH_2$—OCOC($CH_3$)=$CH_2$ |
| 26 | 2-Cl-4-$NO_2$-phenyl | 3-$CH_3$ | —$CH_2$—$C_6H_4$-4-$CO_2$—$CH_2CH_2$—OCOC($CH_3$)=$CH_2$ | —$CH_2$—$C_6H_4$-4-$CO_2$—$CH_2CH_2$—OCOC($CH_3$)=$CH_2$ |
| 27 | 2-Br-4-CN-phenyl | 3-NHCOCH$_3$ | —$CH_2$—$C_6H_4$-4-$CO_2$—$CH_2CH_2$—OCOC($CH_3$)=$CH_2$ | —$CH_2$—$C_6H_4$-4-$CO_2$—$CH_2CH_2$—OCOC($CH_3$)=$CH_2$ |
| 28 | 2,6-di-CN-4-$NO_2$-phenyl | 3-NHCOCH$_3$ | —$CH_2$—$C_6H_4$-4-$CO_2$—$CH_2CH_2$—OCOC($CH_3$)=$CH_2$ | —$CH_2$—$C_6H_4$-4-$CO_2$—$CH_2CH_2$—OCOC($CH_3$)=$CH_2$ |
| 29 | 2-Br-4,6-di-$NO_2$-phenyl | 2-OCH$_3$-5-NHCOCH$_3$ | —$CH_2$—$C_6H_4$-4-$CO_2$—$CH_2CH_2$—OCOC($CH_3$)=$CH_2$ | —$CH_2$—$C_6H_4$-4-$CO_2$—$CH_2CH_2$—OCOC($CH_3$)=$CH_2$ |
| 30 | 2-Cl-4-CH$_3$SO$_2$-phenyl | 3-NHCOCH$_3$ | —$C_2H_5$ | —$CH_2$—$C_6H_4$-4-$CO_2$—$CH_2CH_2$—OCOC($CH_3$)=$CH_2$ |
| 31 | 2-CN-4-CH$_3$SO$_2$-phenyl | 3-NHCOCH$_3$ | —$C_2H_5$ | —$CH_2$—$C_6H_4$-4-$CO_2$—$CH_2CH_2$—OCOC($CH_3$)=$CH_2$ |
| 32 | 2-CN-4-CH$_3$SO$_2$-phenyl | 3-$CH_3$ | —$C_2H_5$ | —$CH_2CH_2O$—$C_6H_3$-3,5-bis-(—$CO_2CH_2$—$C_6H_4$-4-CH=$CH_2$) |
| 33 | 2-Br-4-$NO_2$-phenyl | 3-NHCOCH$_3$ | —$CH_2$—$C_6H_4$-4-($CO_2$—$CH_2$—$C_6H_4$-4-CH=$CH_2$) | —$CH_2$—$C_6H_4$-4-($CO_2$—$CH_2$—$C_6H_4$-4-CH=$CH_2$) |
| 34 | 5-$C_2H_5$S-1,3,4-thiadiazol-2-yl | 3-NHCOCH$_3$ | —$CH_2$—$C_6H_4$-4-($CO_2$—$CH_2$—$C_6H_4$-4-CH=$CH_2$) | —$CH_2$—$C_6H_4$-4-($CO_2$—$CH_2$—$C_6H_4$-4-CH=$CH_2$) |
| 35 | 6-CH$_3$SO$_2$-benzothiazol-2-yl | 3-NHCOCH$_3$ | —$CH_2$—$C_6H_4$-4-($CO_2$—$CH_2$—$C_6H_4$-4-CH=$CH_2$) | —$CH_2$—$C_6H_4$-4-($CO_2$—$CH_2$—$C_6H_4$-4-CH=$CH_2$) |
| 36 | 5,6-di-Cl-benzothiazol-2-yl | 3-NHCOCH$_3$ | —$CH_2$—$C_6H_4$-4-($CO_2$—$CH_2$—$C_6H_4$-4-CH=$CH_2$) | —$CH_2$—$C_6H_4$-4-($CO_2$—$CH_2$—$C_6H_4$-4-CH=$CH_2$) |
| 37 | 5-$NO_2$-benzothiazol-2-yl | 3-NHCOCH$_3$ | —$CH_2$—$C_6H_4$-4-($CO_2$—$CH_2$—$C_6H_4$-4-CH=$CH_2$) | —$CH_2$—$C_6H_4$-4-($CO_2$—$CH_2$—$C_6H_4$-4-CH=$CH_2$) |
| 38 | 4-Br-3-CH$_3$-iso-thiazol-5-yl | 3-NHCOCH$_3$ | —$CH_2$—$C_6H_4$-4-($CO_2$—$CH_2$—$C_6H_4$-4-CH=$CH_2$) | —$CH_2$—$C_6H_4$-4-($CO_2$—$CH_2$—$C_6H_4$-4-CH=$CH_2$) |

TABLE I-continued

Azo Colorants of Formula XIII

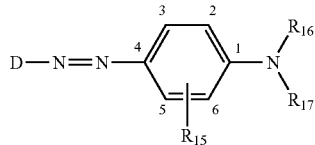

| Example No. | D | $R_{15}$ | $R_{16}$ | $R_{17}$ |
|---|---|---|---|---|
| 39 | 3-$CH_3$-4-CN-iso-thiazol-5-yl | 3-$NHCOCH_3$ | —$CH_2$—$C_6H_4$-4-($CO_2$—$CH_2$—$C_6H_4$-4-CH=$CH_2$) | —$CH_2$—$C_6H_4$-4-($CO_2$—$CH_2$—$C_6H_4$-4-CH=$CH_2$) |
| 40 | 3-$SCH_3$-1,2,4-thiadiazol-5-yl | H | —$CH_2CH_2$—$CO_2$—$CH_2CH_2$—OCOC(CH3)=CH2 | —$CH_2CH_2$—$CO_2$—$CH_2CH_2$—OCOC(CH3)=CH2 |
| 41 | 5-$NO_2$-thiazol-2-yl | 3-$CH_3$ | —$CH_2CH_2O$—$C_6H_4$-2-($CO_2$—$CH_2$—$C_6H_4$-4-CH=$CH_2$) | —$C_2H_5$ |
| 42 | 2-$CH_3CO$-4-$NO_2$-thien-5-yl | 3-$NHCOCH_3$ | —$CH_2CH_2S$—$C_6H_4$-2-($CO_2$—$CH_2CH_2$—$C_6H_4$-4-CH=$CH_2$) | —$C_2H_5$ |
| 43 | 4-$CH_3CO$-2-$NO_2$-thien-5-yl | 3-$CH_3$ | —$CH_2CH_2S$—$C_6H_4$-2-($CO_2$—$CH_2$—$C_6H_4$-4-CH=$CH_2$) | —$CH_2CH_2S$—$C_6H_4$-2-($CO_2$—$CH_2$—$C_6H_4$-4-CH=$CH_2$) |
| 44 | 2,4-di-$CH_3O_2C$-4-$CH_3$-thien-5-yl | H | —$CH_2CH_2O$—$C_6H_4$-4-($CO_2$—$CH_2CH_2OCO$—CH=$CH_2$) | —$C_2H_5$ |
| 45 | 5-$NO_2$-benziso-thiazol-3-yl | 3-$NHCOC_2H_5$ | —$CH_2$—$C_6H_4$-4-($CO_2$—$CH_2CH_2CH_2OCO$—CH=$CH_2$) | —$C_2H_5$ |
| 46 | 4-phthalimidyl | 3-$NHCOCH_3$ | —$CH_2CH_2SO_2$—$C_6H_4$-2-($CO_2$—$CH_2$—CH($CH_3$)—OCO—CH=$CH_2$) | —$C_2H_5$ |
| 47 | 4-Br-N—$C_2H_5$-5-phthalimidyl | 3-$CH_3$ | —$CH_2CH_2NCO$-o-$C_6H_3$—CO-4-($CO_2CH_2$—$C_6H_4$-4-CH=$CH_2$) | —$C_2H_5$ |

TABLE II

Methine Colorants of Formula XV

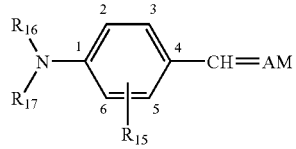

| Example No. | AM | $R_{15}$ | $R_{16}$ | $R_{17}$ |
|---|---|---|---|---|
| 48 | =C(CN)CN | H | —$C_2H_5$ | —$CH_2$—$C_6H_4$-4-($CO_2$—$CH_2CH_2$—OCOC(CH3)CH=$CH_2$) |
| 49 | =C(CN)$SO_2CH_3$ | 3-$CH_3$ | —$CH_2$—$C_6H_4$-4-($CO_2$—$CH_2CH_2$—OCOC(CH3)CH=$CH_2$) | —$CH_2$—$C_6H_4$-4-($CO_2$—$CH_2CH_2$—OCOC(CH3)CH=$CH_2$) |
| 50 | =C(CN)$CO_2CH_3$ | 3-$CH_3$ | —$CH_2CH_2O$—$C_6H_3$-3,5-bis-(—$CO_2CH_2$—$C_6H_4$-4-CH=$CH_2$) | —$C_2H_5$ |
| 51 | =C(CN)$CONH_2$ | 3-$CH_3$ | —$C_2H_5$ | —$CH_2CH_2S$—$C_6H_4$-2-($CO_2$—$CH_2$—$C_6H_4$-4-CH=$CH_2$) |
| 52 | =C(CN)$CO_2C_2H_5$ | 3-$CH_3$ | —$CH_2C_6H_5$ | —$CH_2$—$C_6H_4$-4-($CO_2$—$CH_2$—$C_6H_4$-4-CH=$CH_2$) |
| 53 | =C(CN)CN | 3-$CH_3$ | —$CH_2CH_2NCO$-o-$C_6H_3$—CO-4-($CO_2CH_2$—$C_6H_4$-4-CH=$CH_2$) | —$C_2H_5$ |
| 54 | =C(CN)$CO_2CH_3$ | 3-$CH_3$ | —$CH_2CH_2S$—$C_6H_4$-2-($CO_2$—$CH_2$—$C_6H_4$-4-CH=$CH_2$) | —$CH_3$ |
| 55 | =C(CN)CN | 2,5-di-$OCH_3$ | —$CH_2$—$C_6H_4$-4-($CO_2$—$CH_2CH_2$—OCOC(CH3)CH=$CH_2$) | —$CH_2CH_2O$—$C_6H_4$-2-($CO_2$—$CH_2CH_2$—OCO—CH=$CH_2$) |
| 56 | =C(CN)$CO_2C_2H_5$ | H | —$CH_2CH_2$—$CO_2CH_2$—$C_6H_4$-4-CH=$CH_2$ | —$CH_2CH_2$—$CO_2CH_2$—$C_6H_4$-4-CH=$CH_2$ |

TABLE III

3-Aryl-2,5-Dioxypyrroline Colorants of Formula XVII

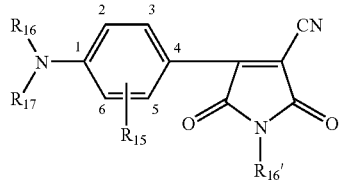

| Example No. | $R_{15}$ | $R_{16}$ | $R_{16}'$ | $R_{17}$ |
|---|---|---|---|---|
| 57 | H | —CH$_2$CH$_3$ | H | —CH$_2$—C$_6$H$_4$-4-(CO$_2$—CH$_2$CH$_2$—OCOC(CH3)=CH$_2$) |
| 58 | H | —CH$_2$CH$_3$ | —CH$_3$ | —C$_6$H$_4$-4-(CO$_2$—CH$_2$—C$_6$H$_4$-4-CH=CH$_2$) |
| 59 | H | —CH$_2$—C$_6$H$_4$-4-(CO$_2$—CH$_2$—C$_6$H$_4$-4-CH=CH$_2$) | —C$_2$H$_5$ | —CH$_2$—C$_6$H$_4$-4-(CO$_2$—CH$_2$—C$_6$H$_4$-4-CH=CH$_2$) |
| 60 | H | —CH$_2$CH$_2$S—C$_6$H$_4$-2-(CO$_2$—CH$_2$CH$_2$—OCOC(CH3)=CH$_2$) | —CH$_2$C$_6$H$_5$ | —CH$_2$CH$_2$S—C$_6$H$_4$-2-(CO$_2$—CH$_2$CH$_2$—OCOC(CH3)=CH$_2$) |
| 61 | H | —CH$_2$CH$_2$O—C$_6$H$_3$-3,5-bis-(-CO$_2$CH$_2$—C$_6$H$_4$-4-CH=CH$_2$) | H | —C$_2$H$_5$ |
| 62 | —CH$_3$ | —CH$_2$—C$_6$H$_4$-4-(CO$_2$—CH$_2$CH$_2$—OCOCH=CH$_2$) | $R_{16}$ | —C$_2$H$_5$ |

TABLE IV

ANTHRAQUINONE COLORANTS OF FORMULA XXa

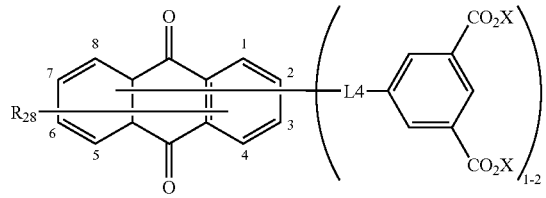

| Example No. | $R_{28}$ | $L_4$ | X |
|---|---|---|---|
| 63 | H | 1-NH— | —CH$_2$—C$_6$H$_4$-4-CH=CH$_2$ |
| 64 | H | 2,7-di-S— | —CH$_2$—C$_6$H$_4$-4-CH=CH$_2$ |
| 65 | H | 1,5-di-NH— | —CH$_2$—C$_6$H$_4$-4-CH=CH$_2$ |
| 66 | H | 1,8-di-NH— | —CH$_2$—C$_6$H$_4$-4-CH=CH$_2$ |
| 67 | H | 1,5-di-S— | —CH$_2$—C$_6$H$_4$-4-CH=CH$_2$ |
| 68 | H | 1,5-di-S— | —CH$_2$CH(CH$_3$)OCOC(CH$_3$)=CH$_2$ |
| 69 | H | 1,5-di-NH— | —CH$_2$—CH(OH)CH$_2$—OCONH—CH$_2$CH$_2$OCOCH=CH$_2$ |
| 70 | 1-NH$_2$-2-Br | 4-NH | —CH$_2$—C$_6$H$_4$-4-C(CH$_3$)=CH$_2$ |
| 71 | 1-NH$_2$-2-SO$_2$C$_6$H$_5$ | 4-NH | —CH$_2$CH(CH$_3$)OCOCH=CH$_2$ |
| 72 | 1-NH$_2$-2-S—C$_6$H$_5$ | 4-NH | —CH$_2$CH$_2$CH$_2$OCOC(CH$_3$)=CH$_2$ |
| 73 | 1-NH$_2$-2-CN | 4-NH | —(CH$_2$)$_4$—OCONHCOC(CH$_3$)=CH$_2$ |
| 74 | 1-NHCH$_3$ | 4-NH | —CH$_2$C(CH$_3$)$_2$CH$_2$OCOC(CH$_3$)=CH$_2$ |
| 75 | 1-NHCH$_2$CH(CH$_3$)$_2$ | 4-S— | —CH$_2$—C$_6$H$_{10}$-4-(CH$_2$OCOC(CH$_3$)=CH$_2$) |
| 76 | 1-NH$_2$-4-OH | 2-O— | —(CH$_2$)$_4$—OCOCH=CH$_2$ |
| 77 | H | 1,4-di-S— | —CH$_2$-1,4-C$_6$H$_4$CH=CH$_2$ |
| 78 | 1-NH$_2$-4-NHC$_6$H$_5$ | 2-S— | —CH$_2$CH$_2$OCONHC(CH$_3$)$_2$—C$_6$H$_4$-3-C(CH$_3$)=CH$_2$ |
| 79 | 1-NH2, 4-S-benzo-thiazol-2-yl | 2-SO$_2$— | —CH$_2$-1,4-C$_6$H$_4$—CH=CH$_2$ |
| 80 | 1,5-di-S—C$_6$H$_5$ | 4,8-di-S— | —CH$_2$CH(CH$_3$)—OCOC(CH$_3$)=CH$_2$ |
| 81 | 1,8-di-NH$_2$-4,5-di-OH | 2,7-di-O— | —CH$_2$CH$_2$OCH$_2$CH$_2$OCOC(CH$_3$)=CH$_2$ |
| 82 | 1,8-di-NH$_2$-4,5-di-OH | 2,5-di-S— | —CH$_2$CH(CH$_3$)OC—C$_6$H$_4$-4-NCOCH=CHCO— |
| 83 | 1,8-di-OH | 4,5-di-S— | —CH$_2$CH$_2$(OCH$_2$CH$_2$)$_3$OCOC(CH$_3$)=CH$_2$ |

TABLE V

Anthraquinone Colorants of Formula XXb

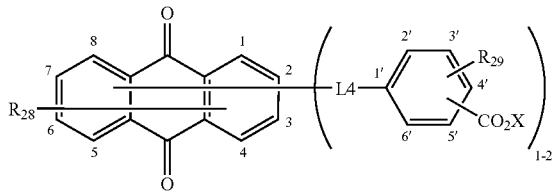

| Example No. | $R_{28}$ | $R_{29}$ | $L_4$ | $—CO_2X$ |
|---|---|---|---|---|
| 84 | H | H | 1-S— | 2'-$CO_2CH_2CH(CH_3)OCOC(CH_3)=CH_2$ |
| 85 | H | H | 1,5-di-NH— | 2'-$CO_2CH_2CH(CH_3)OCOC(CH_3)=CH_2$ |
| 86 | H | 4'-Br | 1,5-di-NH— | 2'-$CO_2CH_2CH(CH_3)OCONHC(CH_3)_2$—$C_6H_4$-3-$C(CH_3)=CH_2$ |
| 87 | H | H | 1,5-di-S— | 3'-$CO_2CH_2CH_2OCOC(CH_3)=CH_2$ |
| 88 | H | H | 1,8-di-S— | 4'-$CO_2CH_2CH_2CH_2OCOCH=CH$—$CO_2H$ |
| 89 | H | 2'-$CH_3$ | 1,4-di-S— | 4'-$CO_2CH_2$—$C_6H_4$-4-$CH=CH_2$ |
| 90 | H | H | 1,4,5,8-tetra-S— | 2'-$CO_2CH_2CH(CH_3)OCOC(CH_3)=CH_2$ |
| 91 | 1,5-di-NH—$C_6H_{11}$ | H | 4,8-di-S— | 2'-$CO_2CH_2CH(CH_3)OCOC(CH_3)=CH_2$ |
| 92 | 1-$NH_2$-2-Br | H | 4-NH— | 2'-$CO_2CH_2CH_2OCONHCOC(CH_3)=CH_2$ |
| 93 | 1-$NH_2$-2-$OCH_3$ | H | 4-S— | 2'-$CO_2CH_2$—$C_6H_4$-4-$C(CH_3)=CH_2$ |
| 94 | 1-$NH_2$-2-$SO_2C_6H_5$ | H | 4-NH— | 2'-$CO_2CH_2CH(CH_3)OCOC(CH_3)=CH_2$ |
| 95 | 1-$NH_2$-4-$NHSO_2CH_3$ | H | 2-O— | 4'$CO_2CH_2CH(OH)CH_2OCOCH=CH_2$ |
| 96 | 1-$NH_2$-2-$CF_3$ | H | 4-S— | 3'-$CO_2CH_2$—$C_6H_4$-4-$CH=CH_2$ |
| 97 | 1,4-di-OH | H | 2-S— | 2'-$CO_2(CH_2)_6OCOC(CH_3)=CH_2$ |
| 98 | 1,8-di-$NH_2$-4,5-di-OH | H | 2,7-di-S— | 2'-$CO_2CH_2CH(CH_3)OCOC(CH_3)=CH_2$ |
| 99 | 5,8-di-S—$C_6H_5$ | H | 1,4-di-S— | 2'-$CO_2CH_2CH(CH_3)OC$-1,3-$C_6H_4$—$CH=CH_2$ |
| 100 | 1,4-bis-(2,6-diethylanilino) | H | 6,7-di-S— | 2'-$CO_2CH_2CH(CH_3)OCOC(CH_3)=CH_2$ |

TABLE VI

ANTHRAQUINONE COLORANTS OF FORMULA XXe

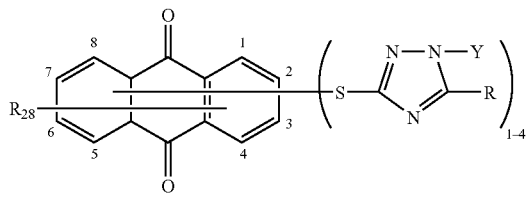

| Example No. | $R_{28}$ | Position | R | Y |
|---|---|---|---|---|
| 101 | H | 1- | H | —$CH_2$—$C_6H_4$-4-$CH=CH_2$ |
| 102 | H | 1,8-di | H | —$CH_2CH_2OCOC(CH_3)=CH_2$ |
| 103 | H | 1,4,5,8-tetra | H | —$CH_2CH_2OCOCH=CH_2$ |
| 104 | 4,5-bis-(-$SC_6H_4$-4-$CH_3$) | 1,8-di | —$CH_3$ | —$CH_2CH_2OCOC(CH_3)=CH_2$ |
| 105 | H | 1,5-di | —$C_6H_5$ | —$CH_2CH(CH_3)OCOCH=CH_2$ |
| 106 | 1-$NH_2$-2-Br | 4- | H | —$CH_2$—$C_6H_4$-4-$CH=CH_2$ |
| 107 | 1-$NH_2$ | 2,4-di | H | —$CH_2CH_2OCOC(CH_3)=CH_2$ |
| 108 | 1-$NH_2$-4-OH | 2- | H | —$CH_2CH_2OCONHC(CH_3)_2$—$C_6H_4$-3-$C(CH_3)=CH_2$ |
| 109 | 1,8-di-$NH_2$-4,5-di-OH | 2,7-di | H | —$CH_2CH_2OCOC(CH_3)=CH_2$ |
| 110 | 1,4-bis-(2,6-diethylanilino) | 6,7-di | H | —$(CH_2)_6$—$OCOC(CH_3)=CH_2$ |
| 111 | 1,4-bis-(2,4,6-trimethylanilino) | 6,7-di | H | —$CONHCOC(CH_3)=CH_2$ |

Position = Position of triazolylthio radical(s):

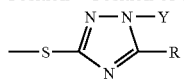

on anthraquinone nucleus of Formula XXe.

TABLE VII

Anthrapyridone Colorants of Formula XXIa

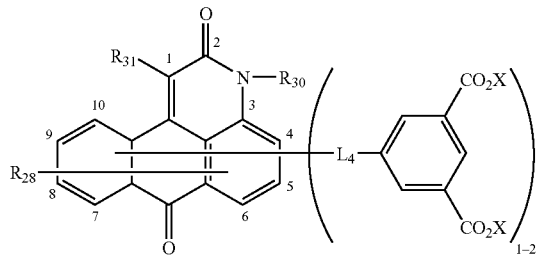

| Example No. | $R_{28}$ | $R_{30}$ | $R_{31}$ | $L_4$ | X |
|---|---|---|---|---|---|
| 112 | H | —$CH_3$ | H | -6-NH— | —$CH_2$—$C_6H_4$-4-CH=$CH_2$ |
| 113 | H | —$CH_3$ | H | -6-NH— | —$CH_2CH_2OCOC(CH_3)$=$CH_2$ |
| 114 | H | —$CH_3$ | H | -6-NH— | —$CH_2CH_2OCOCNHC(CH_3)_2$—$C_6H_4$-4-C($CH_3$)=$CH_2$ |
| 115 | H | —$CH_3$ | —CN | -6-NH— | —$CH_2CH(CH_3)OCOC(CH_3)$=$CH_2$ |
| 116 | H | —$CH_3$ | —CN | -6-NH— | —$CH_2CH(OH)CH_2OCOCH$=$CH_2$ |
| 117 | H | —$C_4H_9$-n | —$CO_2C_2H_5$ | -6-NH— | —$CH_2$—$C_6H_4$-4-CH=$CH_2$ |
| 118 | H | —$CH_3$ | —$CO_2C_2H_5$ | -6-NH— | —$CH_2CH_2OCONHCOC(CH_3)$=$CH_2$ |
| 119 | 4-Br | H | —$CO_2C_2H_5$ | -6-NH— | —$CH_2CH_2CH_2OCOC(CH_3)$=$CH_2$ |
| 120 | 4-$SO_2C_6H_5$ | H | —$CO_2C_2H_5$ | -6-NH— | —$CH_2$—$C_6H_4$-4-CH=$CH_2$ |
| 121 | 4-S—$C_6H_5$ | H | —$CO_2C_2H_5$ | -6-NH— | —$CH_2CH_2OCO$—$C_6H_4$-4-NCOCH=CHCO |
| 122 | 4-$CH_3$ | H | —$COCH_3$ | -6-NH— | —$CH_2CH_2OCH_2CH_2OCOCH$=$CH_2$ |
| 123 | 4-$OC_6H_5$ | H | —$COC_6H_5$ | -6-NH— | —$CH_2$—$C_6H_4$-4-CH=$CH_2$ |
| 124 | H | —$CH_3$ | —$CO_2C_2H_5$ | 4,6-di-S— | —$CH_2$—$C_6H_4$-4-CH=$CH_2$ |
| 125 | 6-$NHC_6H_5$ | —$CH_3$ | —$CO_2C_2H_5$ | 4-O— | —$CH_2$—$C_6H_4$-4-CH=$CH_2$ |
| 126 | 6-$NHC_6H_5$ | —$CH_3$ | —$CO_2C_2H_5$ | 4-S— | —$CH_2CH_2OCOC(CH_3)$=$CH_2$ |
| 127 | H | —$C_6H_5$ | —CN | 6-S— | —$CH_2CH_2OCNH(CH_2)_6$—$OCOC(CH_3)$=$CH_2$ |

TABLE VIII

Anthrapyridone Colorants of Formula XXIb

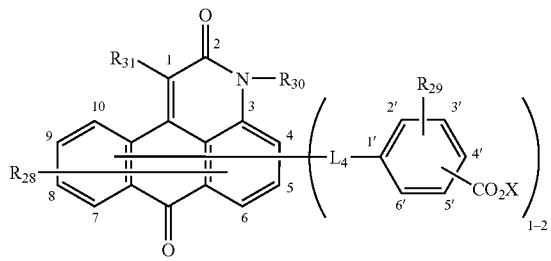

| Example No. | $R_{28}$ | $R_{29}$ | $R_{30}$ | $R_{31}$ | $L_4$ | —$CO_2X$ |
|---|---|---|---|---|---|---|
| 128 | H | H | —$CH_3$ | H | 6-NH— | 2'-$CO_2CH_2$—$C_6H_4$-4-CH=$CH_2$ |
| 129 | H | H | —$CH_3$ | H | 6-S— | 2'-$CO_2CH_2$—$C_6H_4$-4-CH=$CH_2$ |
| 130 | H | 4'-Br | —$CH_3$ | H | 6-NH— | 2'-$CO_2CH_2CH_2OCOC(CH_3)$=$CH_2$ |
| 131 | H | 2'-$CH_3$ | —$CH_3$ | H | 6-NH— | 4'-$CO_2CH_2CH(CH_3)$—$OCOC(CH_3)$=$CH_2$ |
| 132 | H | H | —$CH_3$ | —$CO_2C_2H_5$ | 4-S—, 6-NH— | 2'-$CO_2CH_2CH_2OCH_2CH_2$—$OCOCH$=$CH_2$ |
| 133 | H | H | —$CH_3$ | —$CO_2C_2H_5$ | 6-S— | 4'-$CO_2CH_2$—$C_6H_4$-4-CH=$CH_2$ |
| 134 | 4-Br | H | H | —$CO_2C_2H_5$ | 6-NH— | 3'-$CO_2CH_2CH_2OCOC(CH_3)$=$CH_2$ |
| 135 | 4-$SO_2$—$CH_3$ | H | H | —$CO_2C_2H_5$ | 6-NH— | 2'-$CO_2CH_2$—$C_6H_{10}$-4-($CH_2OCOCH$=$CH_2$) |
| 136 | 4-S—$C_6H_{11}$ | H | H | —$CO_2C_2H_5$ | 6-NH— | 2'-$CO_2CH_2C(CH_3)_2CH_2$—$OCOC(CH_3)$=$CH_2$ |
| 137 | H | H | H | H | 2-benzoxazolyl, 6-NH— | 2'-$CO_2CH_2CH_2OCOC(CH_3)$=$CH_2$ |

TABLE VIII-continued

Anthrapyridone Colorants of Formula XXIb

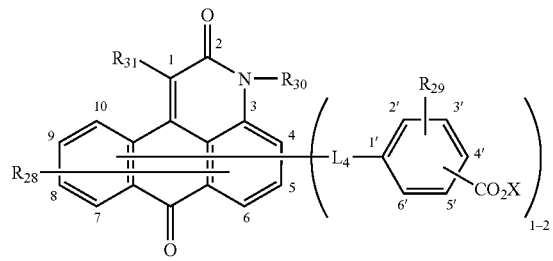

| Example No. | $R_{28}$ | $R_{29}$ | $R_{30}$ | $R_{31}$ | $L_4$ | —$CO_2X$ |
|---|---|---|---|---|---|---|
| 138 | H | H | H | 2-benzo-thiazolyl | 6-NH— | 2'-$CO_2CH_2CH_2OCOC(CH_3)=CH_2$ |
| 139 | H | H | —$C_6H_{11}$ | —$SC_6H_5$ | 6-NH— | 2'-$CO_2CH_2CH_2OCOC(CH_3)=CH_2$ |
| 140 | H | H | —$CH_2C_6H_5$ | —$SO_2C_6H5$ | 6-NH— | 2'-$CO_2CH_2CH_2OCOC(CH_3)=CH_2$ |
| 141 | H | H | —$CH_2CH_2$—$OCH_3$ | —Cl | 6-NH— | 2'-$CO_2CH_2CH_2OCOC(CH_3)=CH_2$ |

TABLE IX

Anthrapyridine Colorants of Formula XXIIa

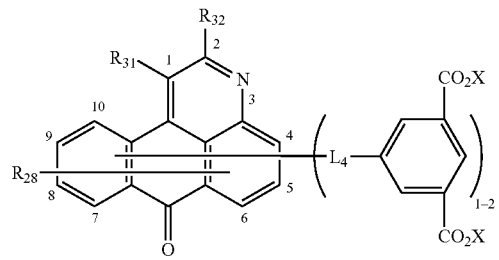

| Example No. | $R_{28}$ | $R_{31}$ | $R_{32}$ | $L_4$ | X |
|---|---|---|---|---|---|
| 142 | H | —CN | —$N(CH_3)_2$ | 6-NH— | —$CH_2$1,4-$C_6H_4$—CH=$CH_2$ |
| 143 | H | —CN | —$N(C_2H_5)_2$ | 6-NH— | —$CH_2CH_2OCOC(CH_3)=CH_2$ |
| 144 | H | —CN | —$N(CH_3)C_6H_5$ | 6-NH— | —$CH_2CH(CH_3)OCOCH=CH_2$ |
| 145 | H | —CN | Piperidino | 6-NH— | —$CH_2CH_2OCNHC(CH_3)_2$—$C_6H_4$-3-C(CH_3)=CH_2$ |
| 146 | H | —CN | Morpholino | 6-NH— | —$CH_2C(CH_3)_2CH_2OCOC(CH_3)=CH_2$ |
| 147 | H | —CN | Pyrrolidino | 4-S—, 6-NH | —$CH_2CH_2OCO$—$C_6H_4$-4-CH=$CH_2$ |
| 148 | H | —CN | —$N(CH_2CH_2OCH_3)_2$ | 4-S—, 6-NH | —$CH_2CH_2OCOC(CH_3)_2$—NHCOC(CH_3)=CH_2$ |
| 149 | H | —CN | —$N(CH_3)C_6H_{11}$ | 6-S | —$CH_2CH_2OCOCH=CH$—$CO_2H$ |
| 150 | H | —CN | —$N(CH_3)C_2H_5$ | 4,6-di-S— | —$(CH_2)_6OCOCH=CH$—$CO_2C_2H_5$ |
| 151 | 4-Br | —CN | —$N(C_2H_5)C_6H_5$ | 6-NH | —$CH_2$—$C_6H_{10}$-4-($CH_2OCOCH=CH_2$) |
| 152 | 4-$SO_2$—$C_6H_5$ | —CN | —$N(CH_3)_2$ | 6-NH | —$CH_2CH(OH)CH_2OCOCH=CH_2$ |
| 153 | 4-$CF_3$ | —CN | —$N(CH_3)_2$ | 6-NH | —$CH_2CH_2(OCH_2CH_2)_3OCOCH=CH_2$ |
| 154 | H | H | H | 6-NH | —$CH_2CH(CH_3)OCOC(CH_3)=CH_2$ |
| 155 | H | $C_6H_5$ | $CH_3$ | 6-NH | —$CH_2CH(CH_3)CH_2OCOCH=CH_2$ |

TABLE X

Anthrapyridine Colorants of Formula XXIIb

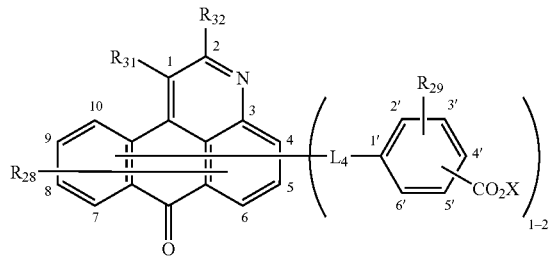

| Example No. | $R_{28}$ | $R_{29}$ | $R_{31}$ | $R_{32}$ | $L_4$ | —$CO_2X$ |
|---|---|---|---|---|---|---|
| 156 | H | H | —CN | Piperidino | -6-NH | 2'-$CO_2CH_2$-1,4-$C_6H_4$—CH=$CH_2$ |
| 157 | H | 4'-Br | —CN | Morpholino | -6-NH | 2'-$CO_2CH_2CH_2OCOC(CH_3)$=$CH_2$ |
| 158 | H | 4'-$CH_3$ | —CN | Pyrrolidino | -6-NH | 3'-$CO_2CH_2CH(CH_3)OCOCH$=$CH_2$ |
| 159 | H | H | —CN | —N($CH_3$)$_2$ | -6-NH | 4'-$CO_2(CH_2)_3OCOC(CH_3)$=$CH_2$ |
| 160 | H | H | —CN | —N($CH_3$)$C_6H_5$ | -4-S-6-NH— | 2'-$CO_2CH_2CH_2OCOC(CH_3)$=$CH_2$ |
| 161 | 4-Br | H | —CN | —N($CH_3$)$C_2H_5$ | 6-S— | 2'-$CO_2CH_2$-1,4-$C_6H_4$—CH=$CH_2$ |
| 162 | 4-$SO_2CH_3$ | H | —CN | —N($CH_3$)$C_6H_{11}$ | 4-$SO_2$-6-NH— | 2'$CO_2CH_2C(CH_3)_2CH_2$—OCOC($CH_3$)=$CH_2$ |
| 163 | 4-CN | H | —CN | —N($CH_2CH_2$—$OC_2H_5$)$_2$ | 6-NH— | 3'-$CO_2CH_2CH_2OCOCH$=CH—$CO_2H$ |
| 164 | 4-$OCH_3$ | H | —CN | —N($C_2H_5$)$C_6H_5$ | 6-NH— | 4'-$CO_2CH_2$—$C_6H_4$-4-CH=$CH_2$ |
| 165 | 6-NH$C_6H_5$ | H | —CN | —N($C_2H_5$)$_2$ | 4-S— | 2'-$CO_2CH_2$—$C_6H_4$-4-C($CH_3$)=$CH_2$ |
| 166 | 4-$SO_2$—N($CH_3$)$_2$ | H | —CN | —N($C_2H_5$)$_2$ | 4-S— | 2'-$CO_2CH_2$—$C_6H_4$-4-C($CH_3$)=$CH_2$ |
| 167 | 4-$CH_3$ | H | —CN | —N($C_2H_5$)$_2$ | 4-S— | 2'-$CO_2CH_2$—$C_6H_{10}$-4-(OCOC($CH_3$)=$CH_2$) |
| 168 | H | H | —$CO_2CH_3$ | —N($C_2H_5$)$_2$ | 6-NH— | 2'$CO_2CH_2CH_2OCH_2CH_2$—OCOCH=$CH_2$ |
| 169 | H | H | H | —$C_6H_5$ | 6-NH— | 2'$CO_2CH_2CH(OH)CH_2$—OCOCH=$CH_2$ |
| 170 | H | H | —$CH_3$ | H | 6-NH— | 2'$CO_2CH_2CH(OH)CH_2$—OCOCH=$CH_2$ |
| 171 | H | H | —$C_6H_5$ | —$CH_3$ | 6-NH— | 2'$CO_2CH_2CH(OH)CH_2$—OCOCH=$CH_2$ |

TABLE XI

Quinophthalone Colorants of Formula XXIII

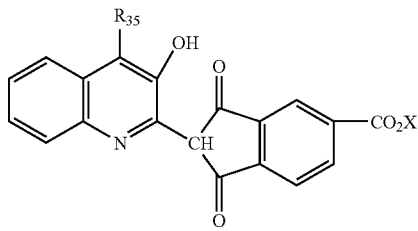

| Example No. | $R_{35}$ | X |
|---|---|---|
| 172 | H | —$CH_2CH_2OCOC(CH_3)$=$CH_2$ |
| 173 | H | —$CH_2CH_2OCONHC(CH_3)_2$—$C_6H_4$-3-C($CH_3$)=$CH_2$ |
| 174 | H | —$CH_2CH(CH_3)OCOCH$=$CH_2$ |
| 175 | H | —$CH_2CH(OH)CH_2OCOC(CH_3)$=$CH_2$ |
| 176 | Br | —$CH_2CH_2OCOC(CH_3)$=$CH_2$ |
| 177 | Br | —$CH_2CH_2OCONHC(CH_3)_2$—$C_6H_4$-3-C($CH_3$)=$CH_2$ |
| 178 | Br | —$CH_2$—$C_6H_4$-4-CH=$CH_2$ |
| 179 | —$SO_2C_6H_5$ | —$CH_2CH_2OCOC(CH_3)$=$CH_2$ |
| 180 | —$SO_2$—$C_6H_4$-4-$CH_3$ | —$CH_2CH_2OCONHCOC(CH_3)$=$CH_2$ |

TABLE XI-continued

Quinophthalone Colorants of Formula XXIII

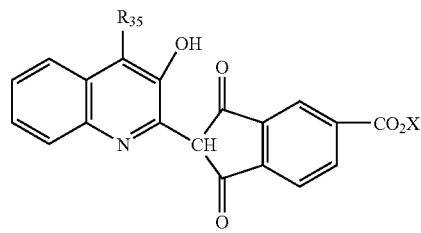

| Example No. | $R_{35}$ | X |
|---|---|---|
| 181 | —S—$C_6H_4$—$CH_3$ | —$CH_2C(CH_3)_2CH_2OCOC(CH_3)$=$CH_2$ |
| 182 | 2-benzothiazolyl | —$CH_2$—$C_6H_{10}$-4-($CH_2OCOC(CH_3)$=$CH_2$) |
| 183 | 2-benzoxazolyl | —$CH_2CH_2O$—$C_6H_4$-4-<br>($OCH_2CH_2OCOC(CH_3)$=$CH_2$) |
| 184 | 1,2,4-triazol-3-ylthio | —$CH_2$—$C_6H_4$-4-($CH_2OCOCH$=$CH_2$) |
| 185 | —S—$C_6H_4$-2-($CO_2CH_2CH_2OCOCH$=$CH_2$) | —$CH_2CH_2OCOCH$=$CH_2$ |

TABLE XII

Nitroarylamine Colorants of Formula XXIV

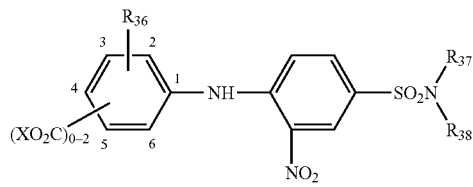

| Example No. | $R_{36}$ | $R_{37}$ | $R_{38}$ | ($CO_2X$)$_{0-2}$ |
|---|---|---|---|---|
| 186 | H | —$CH_3$ | —$CH_3$ | 4-$CO_2CH_2CH_2OCOC(CH_3)$=$CH_2$ |
| 187 | H | —$CH_2CH_3$ | —$CH_2CH_3$ | 3-$CO_2CH_2CH(CH_3)OCOCH$=$CH_2$ |
| 188 | H | —$CH_2CH_3$ | —$CH_3$ | 3,5-di-$CO_2CH_2CH_2$—<br>$OCOC(CH_3)$=$CH_2$ |
| 189 | H | —$C_6H_5$ | —$CH_3$ | 2,5-di-$CO_2(CH_2)_6OCOC(CH_3)$=$CH_2$ |
| 190 | H | —$C_4H_9$-n | H | 2-$CO_2CH_2$—$C_6H_4$-4-$CH$=$CH_2$ |
| 191 | H | —$C_6H_{11}$ | H | 2-$CO_2CH_2CH_2OCONHC(CH_3)_2$—<br>$C_6H_4$-3-$C(CH_3)$=$CH_2$ |
| 192 | H | —$C_6H_5$ | H | 2-$CO_2CH_2CH_2OCOCH$=$CH$—$CO_2H$ |
| 193 | H | —$C_6H_4$-2-($CO_2CH_2CH_2$—<br>$OCOCH$=$CH_2$) | H | H |
| 194 | H | —$C_6H_3$-3,5-bis($CO_2CH_2$—<br>$C_6H_4$—$CH$=$CH_2$) | H | H |
| 195 | H | —$C_6H_4$-2-($CO_2CH_2CH_2$—<br>$OCOC(CH_3)$=$CH_2$) | H | 2-($CO_2CH_2CH_2OCOC(CH_3)$=$CH_2$) |

TABLE XIII

Diarylamino Terephthlate Colorants of Formula XXIX

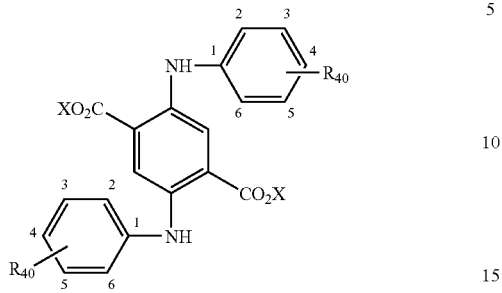

| Example No. | $R_{40}$ | X |
|---|---|---|
| 196 | H | —$CH_2C(CH_3)_2CH_2OCOC(CH_3)$=$CH_2$ |
| 197 | H | —$CH_2$—$C_6H_{10}$-4-($CH_2$—$OCOCH$=$CH_2$) |
| 198 | H | —$CH_2CH_2(OCH_2CH_2)_2OCOC(CH_3)$=$CH_2$ |
| 199 | H | —$CH_2CH(CH_3)OCOC(CH_3)$=$CH_2$ |
| 200 | H | —$CH_2CH(OH)CH_2OCOCH$=$CH_2$ |
| 201 | H | —$CH_2CH_2OCONHC(CH_3)_2$—$C_6H_4$-3-$C(CH_3)$=$CH_2$ |
| 202 | H | —$CH_2CH_2OCONHCOC(CH_3)$=$CH_2$ |
| 203 | 4-$CH_3$ | —$CH_2CH_2OCOC(CH_3)$=$CH_2$ |
| 204 | 4-Cl | —$CH_2$—$C_6H_4$-4-$CH$=$CH_2$ |
| 205 | 4-Br | —$CH_2CH(CH_3)OCOCH$=$CH_2$ |
| 206 | 3-$C_2H_5$ | —$CH_2CH_2OCONH(CH_2)_6OCOC(CH_3)$=$CH_2$ |
| 207 | 4-$C_6H_5$ | —$CH_2CH_2OCOCH$=$CH$—$C_6H_5$ |
| 208 | 2-$CH_3$ | —$CH_2CH_2OCOCH$=$CH$—$CH_3$ |
| 209 | 2,5-di-$CH_3$ | —$CH_2CH_2OCOCH$=$CH$—$CO_2H$ |
| 210 | 4-$OC_2H_5$ | —$CH_2CH_2OCOC(CH_3)_2NHCOC(CH_3)$=$CH_2$ |

TABLE XIV

Miscellaneous Colorants

EXAMPLE 211

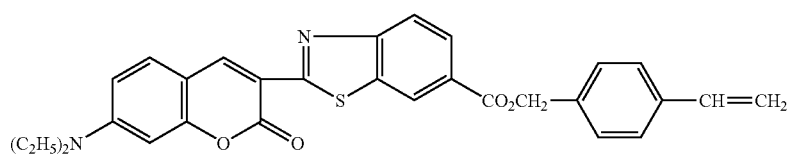

EXAMPLE 212

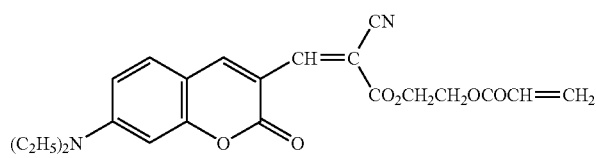

EXAMPLE 213

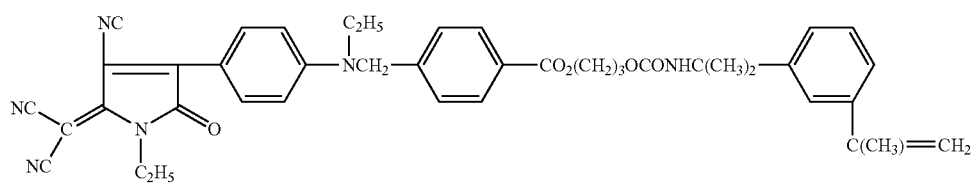

TABLE XIV-continued

Miscellaneous Colorants

EXAMPLE 213

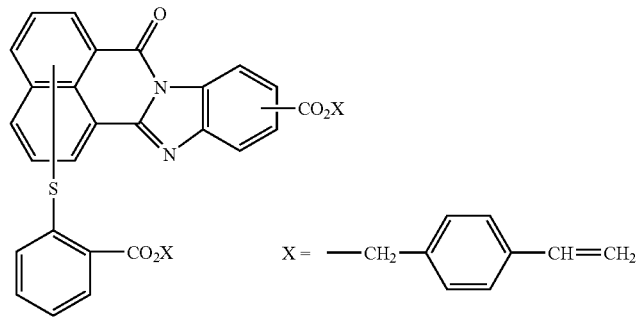

EXAMPLE 214

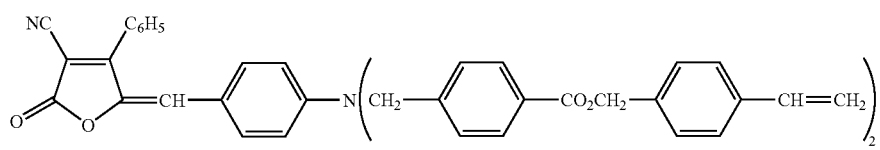

| EXAMPLE 215 | 2(3),16(17)-di-[CO$_2$CH$_2$CH$_2$—OCOC(CH$_3$)=CH$_2$]-PcCu | Pc = phthalocyanine |
| EXAMPLE 216 | 2(3),9(10),16(17),23(24)-Tetra[2'-CO$_2$CH$_2$CH$_2$—O—COC(CH$_3$)=CH$_2$)phenoxy]-PcCu | Pc = Phthalocyanine |

The functionalized dyes or colorants which contain vinyl or substituted vinyl groups are polymerizable or copolymerizable, preferably by free radical mechanisms, said free radicals being generated by exposure to UV light by methods known in the art of preparing UV-cured resins. Polymerization can be facilitated by the addition of photoinitiators. The colored polymeric materials normally are prepared by dissolving the functionalized colorants containing copolymerizable groups in a polymerizable vinyl monomer with or without another solvent and then combining with an oligomeric or polymeric material which contains one or more vinyl or substituted vinyl groups.

The eighth embodiment of the present invention is a coating composition comprising (i) one or more polymerizable vinyl compounds, i.e., vinyl compounds which are copolymerizable with the dye compounds described herein, (ii) one or more of the dye compounds described above, and (iii) at least one photoinitiator. The polymerizable vinyl compounds useful in the present invention contain at least one unsaturated group capable of undergoing polymerization upon exposure to UV radiation in the presence of a photoinitiator, i.e., the coating compositions are radiation-curable. Examples of such polymerizable vinyl compounds include acrylic acid, methacrylic acid and their anhydrides; crotonic acid; itaconic acid and its anhydride; cyanoacrylic acid and its esters; esters of acrylic and methacrylic acids such as allyl, methyl, ethyl, n-propyl, isopropyl, butyl, tetrahydrofurfuryl, cyclohexyl, isobornyl, n-hexyl, n-octyl, isooctyl, 2-ethylhexyl, lauryl, stearyl, and benzyl acrylate and methacrylate; and diacrylate and dimethacrylate esters of ethylene and propylene glycols, 1,3-butylene glycol, 1,4-butanediol, diethylene and dipropylene glycols, triethylene and tripropylene glycols, 1,6-hexanediol, neopentyl glycol, polyethylene glycol, and polypropylene glycol, ethoxylated bisphenol A, ethoxylated and propoxylated neopentyl glycol; triacrylate and trimethacrylate esters of tris-(2-hydroxyethyl)isocyanurate, trimethylolpropane, ethoxylated and propoxylated trimethylolpropane, pentaerythritol, glycerol, ethoxylated and propoxylated glycerol; tetraacrylate and tetramethacrylate esters of pentaerythritol and ethoxylated and propoxylated pentaerythritol; acrylonitrile; vinyl acetate; vinyl toluene; styrene; N-vinyl pyrrolidinone; alpha-methylstyrene; maleate/fumarate esters; maleic/fumaric acid; crotonate esters, and crotonic acid.

The polymerizable vinyl compounds useful in the present invention include polymers which contain unsaturated groups capable of undergoing polymerization upon exposure to UV radiation in the presence of a photoinitiator. The preparation and application of these polymerizable vinyl compounds are well known to those skilled in the art as described, for example, in *Chemistry and Technology of UV and EB Formulation for Coatings, Inks, and Paints,* Volume II: Prepolymers and Reactive Diluents, G. Webster, editor, John Wiley and Sons, London, 1997. Examples of such polymeric, polymerizable vinyl compounds include acrylated and methacrylated polyesters, acrylated and methacrylated polyethers, acrylated and methacrylated epoxy polymers, acrylated or methacrylated urethanes, acrylated or methacrylated polyacrylates (polymethacrylates), and unsaturated polyesters. The acrylated or methacrylated polymers and oligomers typically are combined with monomers which contain one or more acrylate or methacrylate groups, e.g., monomeric acrylate and methacrylate esters, and serve as reactive diluents. The unsaturated polyesters, which are prepared by standard polycondensation techniques known in the art, are most often combined with either styrene or other monomers, which contain one or more acrylate or methacrylate groups and serve as reactive diluents. A second embodiment for the utilization of unsaturated polyesters that is known to the art involves the combination of the unsaturated polyester with monomers that contain two or more vinyl ether groups or two or more vinyl ester groups (WO 96/01283, WO 97/48744, and EP 0 322 808).

The coating compositions of the present invention optionally may contain one or more added organic solvents if desired to facilitate application and coating of the compositions onto the surface of substrates. Typical examples of suitable solvents include, but are not limited to ketones, alcohols, esters, chlorinated hydrocarbons, glycol ethers, glycol esters, and mixtures thereof. Specific examples include, but are not limited to acetone, 2-butanone, 2-pentanone, ethyl acetate, propyl acetate, isopropyl acetate, butyl acetate, isobutyl acetate, ethylene glycol diacetate, ethyl 3-ethoxypropionate, methyl alcohol, ethyl alcohol, propyl alcohol, isopropyl alcohol, butyl alcohol, ethylene glycol, propylene glycol, ethylene glycol monomethyl ether, ethylene glycol monoethyl ether, ethylene glycol monopropyl ether, ethylene glycol monobutyl glycol, diethylene glycol monomethyl ether, diethylene glycol monoethyl ether, diethylene glycol monobutyl ether, propylene glycol monomethyl ether, diethylene glycol monobutyl ether acetate, diethylene glycol monoethyl ether acetate, ethylene glycol monobutyl ether acetate, propylene glycol monomethyl ether acetate, methylene chloride, chloroform, and mixtures thereof. The amount of added or extraneous solvent which may be present in our novel coating compositions may be in the range of about 1 to 70 weight percent, more typically about 1 to 25 weight percent, based on the total weight of the coating composition.

Certain polymerizable vinyl monomers may serve as both reactant and solvent. These contain at least one unsaturated group capable of undergoing polymerization upon exposure to UV radiation in the presence of a photoinitiator. Specific examples include, but are not limited to: methacrylic acid, acrylic acid, ethyl acrylate and methacrylate, methyl acrylate and methacrylate, hydroxyethyl acrylate and methacrylate, diethylene glycol diacrylate, trimethylolpropane triacrylate, 1,6 hexanediol di(meth)acrylate, neopentyl glycol diacrylate and methacrylate, vinyl ethers, divinyl ethers such as diethyleneglycol divinyl ether, 1,6-hexanediol divinyl ether, cyclohexanedimethanol divinyl ether, 1,4-butanediol divinyl ether, triethyleneglycol divinyl ether, trimethylolpropane divinyl ether, and neopentyl glycol divinyl ether, vinyl esters, divinyl esters such as divinyl adipate, divinyl succinate, divinyl glutarate, divinyl 1,4-cyclohexanedicarboxylate, divinyl 1,3-cyclohexanedicarboxylate, divinyl isophthalate, and divinyl terephthalate, N-vinyl pyrrolidone, and mixtures thereof.

In addition, the compositions of the present invention may be dispersed in water rather than dissolved in a solvent to facilitate application and coating of the substrate surface. In the water-dispersed compositions of the present invention a co-solvent is optionally used. Typical examples of suitable cosolvents include but are not limited to acetone, 2-butanone, methanol, ethanol, isopropyl alcohol, ethylene glycol monomethyl ether, ethylene glycol monoethyl ether, ethylene glycol monopropyl ether, and ethylene glycol monobutyl ether, ethylene glycol, and propylene glycol. Typical examples of water-soluble ethylenically unsaturated solvents include but are not limited to: methacrylic acid, acrylic acid, N-vinyl pyrrolidone, 2-ethoxyethyl acrylate and methacrylate, polyethylene glycol dimethacrylate, polypropylene glycol monoacrylate and monomethacrylate, and mixtures thereof. The amount of suitable aqueous organic solvent (i.e., organic solvent and water) in the dispersed coating compositions of the present invention is about 10 to about 90 weight percent, preferably about 75 to about 90 weight percent of the total coating composition.

The coating compositions of the present invention contain one or more of the reactive vinyl dye compounds described herein. The concentration of the dye compound or compounds may be from about 0.005 to 30.0, preferably from about 0.05 to 15.0, weight percent based on the weight of the polymerizable vinyl compound(s) present in the coating composition, i.e., component (i) of the coating compositions. The coating compositions of the present invention normally contain a photoinitiator. The amount of photoinitiator typically is about 1 to 15 weight percent, preferably about 3 to about 5 weight percent, based on the weight of the polymerizable vinyl compound(s) present in the coating composition. Typical photoinitiators include benzoin and benzoin ethers such as marketed under the tradenames ESACURE BO, EB1, EB3, and EB4 from Fratelli Lamberti; VICURE 10 and 30 from Stauffer; benzil ketals such as 2,2-dimethoxy-1,2-diphenylethan-1-one (IRGACURE 651), 2-hydroxy-2-methyl-1-phenylpropan-1-one (IRGACURE 1173), 2-methyl-2-morpholino-1-(p-methylthiophenyl)propan-1-one (IRGACURE 907), alpha-hydroxyalkylphenones such as (1-hydroxycyclohexyl)(phenyl)methanone (IRGACURE 184), 2-benzyl-2-(dimethylamino)-1-(4-morpholinophenyl)butan-1-one (IRGACURE 369), 2-hydroxy-2-methyl-1-phenylpropan-1-one IRGACURE 1173) from Ciba Geigy, Uvatone 8302 by Upjohn; alpha, alpha-dialkoxyacetophenone derivatives such as DEAP and UVATONE 8301 from Upjohn; DAROCUR 116, 1173, and 2959 by Merck; and mixtures of benzophenone and tertiary amines In pigmented coating compositions, the rate of cure can be improved by the addition of a variety of phosphine oxide photoinitiaters such as bis(2,4,6-trimethylbenzoyl)-phenylphosphine oxide (Irganox 819), Irgacure 819, 1700, and 1700 and phosphine oxide mixtures such as a 50/50 by weight mixtures of IRGACURE 1173 and 2,4,6-trimethylbenzoyldiphenylphosphine oxide (DAROCUR 4265) from Ciba. Further details regarding such photoinitiators and curing procedures may be found in the published literature such as U.S. Pat. No. 5,109,097, incorporated herein by reference. Depending upon the thickness of the coating (film), product formulation, photoinitiator type, radiation flux, and source of radiation, exposure times to ultraviolet radiation of about 0.5 second to about 30 minutes (50–5000 mJ/square cm) typically are required for curing. Curing also can occur from solar radiation, i.e., sunshine.

The coating compositions of the present invention may contain one or more additional components typically present in coating compositions. Examples of such additional components include leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; and/or coalescing agents. The coating compositions of the present invention also may contain non-reactive modifying resins. Typical non-reactive modifying resins include homopolymers and copolymers of acrylic and methacrylic acid; homopolymers and copolymers of alkyl esters of acrylic and methacrylic acid such as methyl, ethyl, n-propyl, isopropyl, butyl, tetrahydrofurfuryl, cyclohexyl, isobornyl, n-hexyl, n-octyl, isooctyl, 2-ethylhexyl, lauryl, stearyl, and benzyl acrylate and methacrylate; acrylated and methacrylated urethane, epoxy, and polyester resins, silicone acrylates, cellulose esters such as cellulose acetate butyrates, cellulose acetate, propionates, nitrocellulose, cellulose ethers such as methyl cellulose, ethyl cellulose, hydroxypropyl cellulose, and hydroxypropyl methyl cellulose.

Typical plasticizers include alkyl esters of phthalic acid such as dimethyl phthalate, diethyl phthalate, dipropyl phthalate, dibutyl phthalate, and dioctyl phthalate; citrate esters such as triethyl citrate and tributyl citrate; triacetin and tripropionin; and glycerol monoesters such as Eastman 18-04, 18-07, 18-92 and 18-99 from Eastman Chemical Company. Specific examples of additional additives can be found in *Raw Materials Index,* published by the National Paint & Coatings Association, 1500 Rhode Island Avenue, N.W., Washington, D.C. 20005.

The ninth embodiment of the present invention pertains to a polymeric composition, typically a polymeric coating, comprising a polymer of one or more acrylic acid esters, one or more methacrylic acid esters and/or other polymerizable vinyl compounds, having copolymerized therein one or more of the dye compounds described above. The colored polymeric compositions provided by our invention may be prepared from the coating compositions described above and typically contain from about 0.005 to 30.0 weight percent, preferably from about 05 to 15.0 weight percent, of the reactive or polymerized residue of one or more of the vinyl dye compounds described herein based on the weight of the composition or coating. The novel polymeric coatings may have a thickness of about 2.5 to 150 microns, more typically about 15 to 65 microns.

The polymeric coatings of the present invention typically have a solvent resistance of at least 100 MEK double rubs using ASTM Procedure D-3732; preferably a solvent resistance of at least about 200 double rubs. Such coatings also typically have a pencil hardness of greater than or equal to F using ASTM Procedure D-3363; preferably a pencil hardness of greater than or equal to H. The coating compositions can be applied to substrates with conventional coating equipment. The coated substrates are then exposed to radiation such as ultraviolet light in air or in nitrogen which gives a cured finish. Mercury vapor or Xenon lamps are applicable for the curing process. The coatings of the present invention can also be cured by electron beam.

The radiation-curable coating compositions of this invention are suitable as adhesives and coatings for such substrates as metals such as aluminum and steel, plastics, glass, wood, paper, and leather. On wood substrates the coating compositions may provide both overall transparent color and grain definition. Various aesthetically-appealing effects can be achieved thereby. Due to reduced grain raising and higher film thicknesses, the number of necessary sanding steps in producing a finished wood coating may be reduced when using the colored coating compositions of the invention rather than conventional stains. Coating compositions within the scope of our invention may be applied to automotive base coats where they can provide various aesthetically-appealing effects in combination with the base coats and color differences dependent on viewing angle (lower angles create longer path lengths and thus higher observed color intensities). This may provide similar styling effects as currently are achieved with metal flake orientation in base coats.

Various additional pigments, plasticizers, and stabilizers may be incorporated to obtain certain desired characteristics in the finished products. These are included in the scope of the invention.

Coating, Curing, and Testing Procedures:

Samples of formulations were used to coat glass plates using a knife blade. The wet film thickness was about 15 to 75 microns (0.6 to 3.0 mils). The solvent was evaporated to give a clear, somewhat tacky film. Prior to exposure to UV radiation, each film was readily soluble in organic solvents.

The dried film on the glass plate was exposed to UV radiation from a 200 watt per inch medium pressure mercury vapor lamp housed in an American Ultraviolet Company instrument using a belt speed of 25 ft. per minute. One to five passes under the lamp resulted in a crosslinked coating with maximum hardness and solvent resistance.

Each cured coating (film) may be evaluated for Konig Pendulum Hardness (ASTM D4366 DIN 1522), solvent resistance by the methyl ethyl ketone double-rub test, and solubility in acetone before and after exposure to UV radiation. The damping time for Konig Pendulum Hardness on uncoated glass is 250 seconds; coatings with hardness above 100 seconds are generally considered hard coatings. The methyl ethyl ketone (MEK) double rub test is carried out in accordance with ASTM Procedure D-3732 by saturating a piece of cheese cloth with methyl ethyl ketone, and with moderate pressure, rubbing the coating back and forth. The number of double rubs is counted until the coating is removed. The acetone solubility test is carried out by immersing a dry, pre-weighed sample of the cured film in acetone for 48 hours at 25° C. The film is removed, dried for 16 hours at 60° C. in a forced-air oven, and reweighed. The weight percent of the insoluble film remaining is calculated from the data.

COATING EXAMPLES

The coatings and coating compositions provided by the present invention and the preparation thereof are further illustrated by the following examples.

Example 217

A colored, photopolymerizable composition was prepared by thoroughly mixing 0.5 g the yellow dye of Example 7 with a coating composition consisting of 20 g Jägalux UV1500 polyester acrylate, 10 g of bisphenol A epoxy acrylate, 9 g dipropyleneglycol diacrylate (DPGDA), 7 g trimethylolpropane triacrylate (TMPTA), and 4 g of Darocure 1173 photoinitiator using a small Cowles mixer until the components were completely dispersed. The resulting coating composition containing 1% of the yellow dye was drawn down with a wire wound rod to provide a 25.4 micron (1 mil) thick coating on an oak wood panel. This panel was passed through a UV cure machine at a speed of 6.1 meters per minute (20 feet/minute) using a lamp with an intensity of 118.1 watts per cm (300 watts per inch). The same coating solutions were applied to glass panels and cured under the same conditions of exposure. Konig Pendulum Hardness measurements (ASTM D4366 DIN 1522) were conducted on the coated glass panels and indicated no significant loss of hardness due to incorporation of the dye; hardness was 86 Konig seconds compared with 82 seconds for a reference coating, which contained no polymerizable dye. Adhesion of the coating to an oak wood panel was measured using the crosshatch adhesion method according to ASTM method D 3359 (ISO 2409). A right angle lattice pattern (6 lines in each direction) is cut into the coating, penetrating to the substrate, creating 25 squares with each side of the squares measuring 1 mm. A 2.5 cm (1 inch) wide piece of tape is applied to the lattice, pressure is applied, and then the tape is pulled from the substrate. If the edges are smooth and none of the squares are detached, the adhesion is 100% (ASTM rating 5B). On the wood panel a 5B rating was achieved for both the reference and the dye-containing coatings. Chemical resistance was tested with MEK double rubs on glass. Both the reference, which contained no polymerizable dye, and the coatings, which contained polymerizable dyes, withstood more than 300 MEK double rubs. No dye color was observed on the white cheesecloth of the MEK rub test, which is an indication that the dyes cannot be extracted from the coatings with solvents and demonstrates complete incorporation of the dye into the polymer matrix of the cured film.

Example 218

A colored, photopolymerizable composition was prepared by thoroughly mixing 0.5 g the red dye of Example 8b with a coating composition consisting of 20 g Jägalux UV1500 polyester acrylate, 10 g of bisphenol A epoxy acrylate, 9 g dipropyleneglycol diacrylate (DPGDA), 7 g trimethylolpropane triacrylate (TMPTA), and 4 g of Darocure 1173 photoinitiator in a small Cowles mixer until the components were completely dispersed. The resulting coating composition, which contained 1% of the red dye, was drawn down with a wire wound rod to provide a 25.4 micron (1 mil) thick coating on an oak wood panel. This panel was passed through a UV cure machine at a speed of 6.1 meters per minute (20 feet/minute) using a lamp with an intensity of 1 18.1 watts per cm (300 watts per inch). The same coating solutions were applied to glass panels and cured under the same conditions of exposure. Konig Pendulum Hardness measurements conducted on the coated glass panels showed no significant loss of hardness due to incorporation of the dye; hardness was 76 Konig seconds compared with 82 seconds for a reference coating which contained no polymerizable dye.

The invention has been described in detail with particular reference to preferred embodiments thereof, but it will be understood that variations and modifications can be effected within the spirit and scope of the invention.

We claim:

1. Photopolymerizable colorant compounds having Formula I:

   I wherein

A, is a mono-, di-, tri- or tetravalent chromophore;
X is —$R_1$—O—Q or the phtopolymerizable group —$CH_2$—$C_6H_4$-p-C($R_2$)=$CH_2$;
$R_1$ is $C_2$–$C_8$ alkylene, —(—$CH_2CH_2O$—)$_m$—$CH_2CH_2$— or 1,4-cyclohexylenedimethylene;
$R_2$ is hydrogen or $C_1$–$C_6$ alkyl;
n is 1 to 4;
m is 1–3;
Q is a photopolymerizable group selected from an organic radical having the formula:

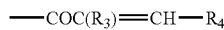   Ia

   IIa

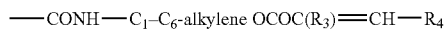   IIIa

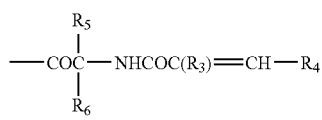   IVa

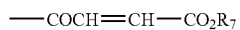   Va

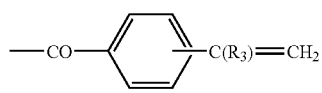   VIa

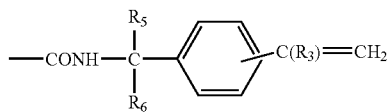   VIIa

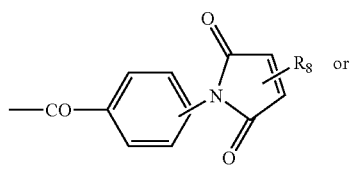   VIIIa

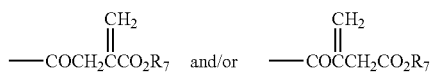   IXa wherein $R_3$ is hydrogen or $C_1$–$C_6$ alkyl;
$R_4$ is hydrogen; $C_1$–$C_6$ alkyl; phenyl; phenyl substituted with one or more groups selected from $C_1$–$C_6$ alkyl, $C_1$–$C_6$ alkoxy, —N($C_1$–$C_6$ alkyl)$_2$, nitro, cyano, $C_2$–$C_6$ alkoxycarbonyl, $C_2$–$C_6$ alkanoyloxy and halogen; 1- or 2-naphthyl; 1- or 2-naphthyl substituted with $C_1$–$C_6$ alkyl or $C_1$–$C_6$ alkoxy; 2- or 3-thienyl; 2- or 3-thienyl substituted with $C_1$–$C_6$ alkyl or halogen; 2- or 3-furyl; or 2- or 3-furyl substituted with $C_1$–$C_6$ alkyl;
$R_5$ and $R_6$ are independently selected from hydrogen, $C_1$–$C_6$ alkyl, substituted $C_1$–$C_6$ alkyl; or aryl; or $R_5$ and $R_6$ may be combined to represent a —(—$CH_2$—)$_{3-5}$— radical;
$R_7$ is hydrogen or $C_1$–$C_6$ alkyl, substituted $C_1$–$C_6$ alkyl, $C_3$–$C_8$ alkenyl, $C_3$–$C_8$ cycloalkyl or aryl; and
$R_8$ is hydrogen, $C_1$–$C_6$ alkyl or aryl; and wherein A is a 2,5-diarylaminoterephthalic ester chromophore.

2. Photopolymerizable colorant compounds according to claim 1 wherein X is —$CH_2CH_2OQ$, —$CH_2CH(CH_3)OQ$, —($CH_2CH_2O$)$_{1-2}$—$CH_2CH_2OQ$, —$CH_2C(CH_3)_2CH_2OQ$, or —$CH_2$—$C_6H_{10}$—$CH_2OQ$.

3. Photopolymerizable colorant compounds according to claim 1 wherein Q is —COCH=$CH_2$ or —COC($CH_3$)=$CH_2$.

4. Photopolymerizable colorant compounds according to claim 1 wherein X is —$CH_2$—$C_6H_4$-4-C($R_2$)=$CH_2$ wherein $R_2$ is hydrogen or methyl; or —$R_1$—O—Q wherein $R_1$ is —($CH_2$)$_{2-4}$—, —$CH_2CH(CH_3)$—, —$CH_2C(CH_3)_2CH_2$—, —($CH_2CH_2O$—)$_{1-2}CH_2CH_2$—, —$CH_2CH(OH)CH_2$—, or $CH_2$—$C_6H_{10}$-4-$CH_2$—; and Q is —COC($R_3$)=$CH_2$ wherein $R_3$ is hydrogen or methyl; or —CONHC($CH_3$)$_2$—$C_6H_4$-4-C($CH_3$)=$CH_2$.

5. Process for the preparation of the photopolymerizable colorants defined in claim 1 wherein X is a p-vinylbenzyl radical having the formula —$CH_2$—$C_6H_4$-p-C($R_2$)=$CH_2$ which comprises reacting colored acidic compounds having the structure:

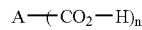

with a compound having the structure $ClCH_2$—$C_6H_4$-p-C($R_2$)=$CH_2$ in the presence of base.

6. Process for the preparation of the photopolymerizable colorant compounds defined in claim 1 wherein X is —CH$_2$CH$_2$—O—Q or —CH$_2$CH(CH$_3$)—O—Q, which comprises the steps of:

(a) reacting colored acidic compounds having the structure:

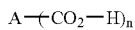

with at least about n molecular equivalents of ethylene or propylene carbonate for each molecular equivalent of acidic compound to produce the 2-hydroxyalkyl derivatives of said acidic compound;

(b) reacting said colored 2-hydroxyalkyl derivatives with about n molecular equivalents of one or more acylating agents having the structures:

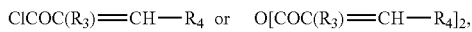 Ib

 IIb

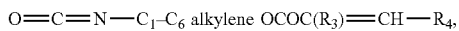 IIIb

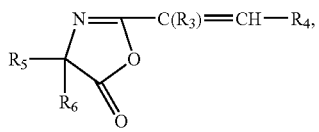 IVb

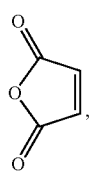 Vb

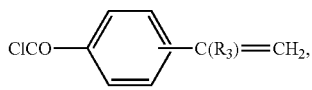 VIb

-continued

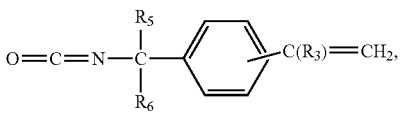 VIIb

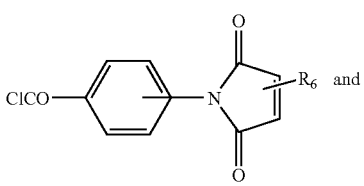 VIIIb and

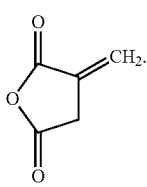 IXb

7. A photopolymerizable 2,5-diarylaminoterephthalate colorant compound defined in claim 4 having the formula

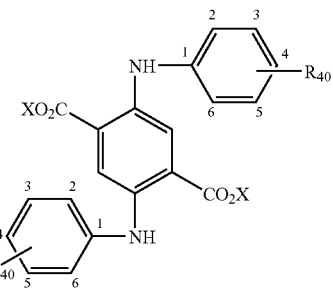

wherein $R_{40}$ is hydrogen, $C_1$–$C_6$ alkyl, $C_1$–$C_6$ alkoxy, or halogen.

* * * * *